US008145735B2

(12) United States Patent
Manchester et al.

(10) Patent No.: US 8,145,735 B2
(45) Date of Patent: Mar. 27, 2012

(54) CONFIGURING NETWORK SETTINGS USING PORTABLE STORAGE MEDIA

(75) Inventors: Scott Manchester, Redmond, WA (US); Benjamin Nick, Seattle, WA (US); Trevor W. Freeman, Sammamish, WA (US); Dalen Abraham, Duvall, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/088,943

(22) Filed: Apr. 18, 2011

(65) Prior Publication Data
US 2011/0196946 A1 Aug. 11, 2011

Related U.S. Application Data

(63) Continuation of application No. 12/422,750, filed on Apr. 13, 2009, now Pat. No. 7,930,374, which is a continuation of application No. 10/806,369, filed on Mar. 23, 2004, now Pat. No. 7,546,357.

(60) Provisional application No. 60/534,795, filed on Jan. 7, 2004.

(51) Int. Cl.
*G06F 15/177* (2006.01)
(52) U.S. Cl. ......... 709/220; 709/221; 709/222; 709/227
(58) Field of Classification Search .................. 709/220, 709/221, 222, 227
See application file for complete search history.

(56) References Cited

U.S. PATENT DOCUMENTS

| 4,102,493 A | 7/1978 | Moreno |
| 4,783,766 A | 11/1988 | Samachisa et al. |
| 4,805,222 A | 2/1989 | Young et al. |
| 4,922,734 A | 5/1990 | Iannucci |
| 4,970,692 A | 11/1990 | Ali et al. |
| 5,553,314 A | 9/1996 | Grube et al. |
| 5,557,124 A | 9/1996 | Roy et al. |
| 5,566,331 A | 10/1996 | Irwin et al. |
| 5,727,212 A | 3/1998 | Dinallo |
| 5,815,682 A | 9/1998 | Williams et al. |
| 5,838,907 A | 11/1998 | Hansen |
| 5,881,372 A | 3/1999 | Kruys |
| 5,918,158 A | 6/1999 | LaPorta et al. |
| 5,930,362 A | 7/1999 | Daly et al. |
| 5,933,504 A | 8/1999 | Vanstone et al. |
| 5,949,776 A | 9/1999 | Mahany et al. |

(Continued)

FOREIGN PATENT DOCUMENTS

CN 1441374 9/2003

(Continued)

OTHER PUBLICATIONS

"21stCentury Locks Fingerprint Locks", http://www.21stcentruylocks.com/outbacker.htm, (2004), 2 pages.

(Continued)

*Primary Examiner* — Liangche A Wang

(57) ABSTRACT

A portable computer-readable media device and method of use enable automatic configuration of a computing device, such as a conventional network device or a thin client device, for operation in a network. Configuration information, including network settings and security information, is incorporated in an XML file written to the portable media device while it is installed in a first device. This configuration is then automatically transferred to a second device by installing the portable media device in the second device. The second device then writes device information, incorporated in an XML file, to the portable media device, to be uploaded to the first device.

20 Claims, 24 Drawing Sheets

U.S. PATENT DOCUMENTS

| | | | |
|---|---|---|---|
| 5,966,082 | A | 10/1999 | Cofino et al. |
| 6,011,724 | A | 1/2000 | Brigati et al. |
| 6,041,075 | A | 3/2000 | Caushik |
| 6,052,720 | A | 4/2000 | Traversat et al. |
| 6,078,667 | A | 6/2000 | Johnson |
| 6,148,332 | A | 11/2000 | Brewer et al. |
| 6,148,354 | A | 11/2000 | Ban et al. |
| 6,178,507 | B1 | 1/2001 | Vanstone |
| 6,195,433 | B1 | 2/2001 | Vanstone et al. |
| 6,202,147 | B1 | 3/2001 | Slaughter et al. |
| 6,219,707 | B1 | 4/2001 | Gooderum et al. |
| 6,226,719 | B1 | 5/2001 | Minow |
| 6,324,537 | B1 | 11/2001 | Moran |
| 6,411,823 | B1 | 6/2002 | Chen |
| 6,411,829 | B1 | 6/2002 | Takenaka et al. |
| 6,449,642 | B2 | 9/2002 | Bourke-Dunphy et al. |
| 6,470,397 | B1 | 10/2002 | Shah et al. |
| 6,480,711 | B1 | 11/2002 | Guedalia |
| 6,526,264 | B2 | 2/2003 | Sugar et al. |
| 6,539,380 | B1 | 3/2003 | Moran |
| 6,563,928 | B1 | 5/2003 | Vanstone et al. |
| 6,600,726 | B1 | 7/2003 | Nevo et al. |
| 6,603,744 | B2 | 8/2003 | Mizutani et al. |
| 6,614,768 | B1 | 9/2003 | Mahany et al. |
| 6,615,038 | B1 | 9/2003 | Moles et al. |
| 6,633,929 | B1 | 10/2003 | Hyder |
| 6,654,797 | B1 | 11/2003 | Kamper |
| 6,654,841 | B2 | 11/2003 | Lin |
| 6,658,018 | B1 | 12/2003 | Tran et al. |
| 6,667,906 | B2 | 12/2003 | Park et al. |
| 6,687,492 | B1 | 2/2004 | Sugar et al. |
| 6,693,651 | B2 | 2/2004 | Biebesheimer et al. |
| 6,700,450 | B2 | 3/2004 | Rogers |
| 6,704,293 | B1 | 3/2004 | Larsson et al. |
| 6,714,605 | B2 | 3/2004 | Sugar et al. |
| 6,728,270 | B1 | 4/2004 | Meggers et al. |
| 6,728,517 | B2 | 4/2004 | Sugar et al. |
| 6,738,027 | B1 | 5/2004 | Doolittle |
| 6,738,834 | B1 | 5/2004 | Williams et al. |
| 6,754,725 | B1 | 6/2004 | Wright et al. |
| 6,785,520 | B2 | 8/2004 | Sugar et al. |
| 6,792,286 | B1 | 9/2004 | Bharath et al. |
| 6,795,967 | B1 | 9/2004 | Evans et al. |
| 6,801,756 | B1 | 10/2004 | Agrawal et al. |
| 6,813,662 | B2 | 11/2004 | Park |
| 6,842,460 | B1 | 1/2005 | Olkkonen et al. |
| 6,850,735 | B2 | 2/2005 | Sugar et al. |
| 6,885,585 | B2 | 4/2005 | Maayan et al. |
| 6,907,532 | B2 | 6/2005 | Arkko et al. |
| 6,922,734 | B2 | 7/2005 | Teicher |
| 6,934,853 | B2 | 8/2005 | Christopherson et al. |
| 6,944,650 | B1 | 9/2005 | Urien |
| 6,976,253 | B1 | 12/2005 | Wierman et al. |
| 6,990,656 | B2 | 1/2006 | Ersek et al. |
| 7,000,015 | B2 | 2/2006 | Moore et al. |
| 7,013,331 | B2 * | 3/2006 | Das ............................ 709/220 |
| 7,035,593 | B2 | 4/2006 | Miller et al. |
| 7,058,180 | B2 | 6/2006 | Ferchichi et al. |
| 7,103,874 | B2 | 9/2006 | McCollum et al. |
| 7,130,425 | B2 | 10/2006 | Strasser et al. |
| 7,151,542 | B2 | 12/2006 | Isner |
| 7,165,154 | B2 | 1/2007 | Coombs et al. |
| 7,177,957 | B2 | 2/2007 | Vance |
| 7,181,012 | B2 | 2/2007 | Arkko et al. |
| 7,181,542 | B2 | 2/2007 | Tuomenoksa et al. |
| 7,181,620 | B1 | 2/2007 | Hur |
| 7,188,365 | B2 | 3/2007 | Balissat et al. |
| 7,194,263 | B2 | 3/2007 | Bahl et al. |
| 7,207,059 | B1 | 4/2007 | Kurian et al. |
| 7,219,332 | B2 | 5/2007 | Gouge et al. |
| 7,231,640 | B2 | 6/2007 | Evans et al. |
| 7,243,269 | B2 | 7/2007 | Saotome et al. |
| 7,269,730 | B2 | 9/2007 | Stirbu |
| 7,296,098 | B2 | 11/2007 | Shih |
| 7,340,611 | B2 | 3/2008 | Alev et al. |
| 7,440,754 | B2 | 10/2008 | Bahl et al. |
| 7,546,357 | B2 | 6/2009 | Manchester et al. |
| 7,616,588 | B2 | 11/2009 | Gatta et al. |
| 7,657,612 | B2 | 2/2010 | Manchester et al. |
| 7,710,587 | B2 | 5/2010 | Crosier et al. |
| 7,826,833 | B2 | 11/2010 | Madhavan et al. |
| 7,930,374 | B2 | 4/2011 | Manchester et al. |
| 2001/0014153 | A1 | 8/2001 | Johnson |
| 2001/0029607 | A1 | 10/2001 | Veres et al. |
| 2002/0007407 | A1 | 1/2002 | Klein |
| 2002/0009199 | A1 | 1/2002 | Ala-Laurila et al. |
| 2002/0012329 | A1 | 1/2002 | Atkinson et al. |
| 2002/0019901 | A1 | 2/2002 | Shin |
| 2002/0053031 | A1 | 5/2002 | Bendinelli et al. |
| 2002/0082047 | A1 | 6/2002 | Souissi et al. |
| 2002/0087868 | A1 * | 7/2002 | King et al. .................... 713/185 |
| 2002/0090085 | A1 | 7/2002 | Vanstone et al. |
| 2002/0095595 | A1 | 7/2002 | Christopherson et al. |
| 2002/0112058 | A1 | 8/2002 | Weisman et al. |
| 2002/0152380 | A1 | 10/2002 | O'Shea et al. |
| 2002/0152384 | A1 | 10/2002 | Shelest et al. |
| 2002/0178295 | A1 | 11/2002 | Buczek et al. |
| 2003/0009640 | A1 | 1/2003 | Arimilli et al. |
| 2003/0031188 | A1 * | 2/2003 | Ishibashi ........................ 370/400 |
| 2003/0046554 | A1 | 3/2003 | Leydier et al. |
| 2003/0055892 | A1 | 3/2003 | Huitema et al. |
| 2003/0078072 | A1 | 4/2003 | Serceki et al. |
| 2003/0081791 | A1 | 5/2003 | Erickson et al. |
| 2003/0101247 | A1 | 5/2003 | Kumbalimutt et al. |
| 2003/0145157 | A1 | 7/2003 | Smullen et al. |
| 2003/0154287 | A1 | 8/2003 | Sullivan |
| 2003/0158842 | A1 | 8/2003 | Levy et al. |
| 2003/0167376 | A1 | 9/2003 | Koh |
| 2003/0177428 | A1 | 9/2003 | Wakabayashi et al. |
| 2003/0206542 | A1 | 11/2003 | Holder |
| 2003/0217126 | A1 * | 11/2003 | Polcha et al. ................. 709/220 |
| 2003/0224741 | A1 | 12/2003 | Sugar |
| 2003/0225971 | A1 | 12/2003 | Oishi et al. |
| 2004/0002943 | A1 | 1/2004 | Merrill et al. |
| 2004/0010429 | A1 | 1/2004 | Vedula et al. |
| 2004/0024875 | A1 | 2/2004 | Horvitz et al. |
| 2004/0038592 | A1 | 2/2004 | Yang |
| 2004/0059925 | A1 | 3/2004 | Benhammou et al. |
| 2004/0100834 | A1 | 5/2004 | Waters et al. |
| 2004/0103288 | A1 | 5/2004 | Ziv et al. |
| 2004/0107303 | A1 | 6/2004 | Mulligan |
| 2004/0111439 | A1 | 6/2004 | Richardson et al. |
| 2004/0148333 | A1 | 7/2004 | Manion et al. |
| 2004/0162076 | A1 | 8/2004 | Chowdry et al. |
| 2004/0221298 | A1 * | 11/2004 | Cedola ........................ 719/321 |
| 2004/0236804 | A1 | 11/2004 | Bots et al. |
| 2005/0004916 | A1 | 1/2005 | Miller et al. |
| 2005/0043019 | A1 | 2/2005 | Nakamura et al. |
| 2005/0044479 | A1 | 2/2005 | Willams et al. |
| 2005/0102529 | A1 | 5/2005 | Buddhikot et al. |
| 2005/0109841 | A1 | 5/2005 | Ryan et al. |
| 2005/0118977 | A1 | 6/2005 | Drogi et al. |
| 2005/0119936 | A1 | 6/2005 | Buchanan et al. |
| 2005/0149204 | A1 | 7/2005 | Manchester et al. |
| 2005/0149626 | A1 | 7/2005 | Manchester et al. |
| 2005/0149732 | A1 | 7/2005 | Freeman et al. |
| 2005/0149757 | A1 | 7/2005 | Corbett et al. |
| 2005/0163042 | A1 | 7/2005 | Roberts |
| 2005/0193103 | A1 | 9/2005 | Drabik |
| 2005/0198221 | A1 | 9/2005 | Manchester et al. |
| 2005/0198233 | A1 | 9/2005 | Manchester et al. |
| 2005/0216639 | A1 | 9/2005 | Sparer et al. |
| 2005/0272371 | A1 | 12/2005 | Komatsuzaki et al. |
| 2006/0013160 | A1 | 1/2006 | Haartsen |
| 2006/0069814 | A1 | 3/2006 | Abraham et al. |
| 2006/0069840 | A1 | 3/2006 | Corbett et al. |
| 2006/0095647 | A1 | 5/2006 | Battaglia et al. |
| 2006/0101456 | A1 | 5/2006 | Crosier et al. |
| 2006/0183490 | A1 | 8/2006 | Madhavan et al. |
| 2006/0221915 | A1 | 10/2006 | Gatta et al. |
| 2006/0279412 | A1 | 12/2006 | Holland et al. |
| 2006/0283930 | A1 | 12/2006 | Shafer et al. |
| 2006/0289639 | A1 | 12/2006 | Shafer et al. |
| 2006/0289646 | A1 | 12/2006 | Shafer et al. |
| 2006/0289647 | A1 | 12/2006 | Shafer et al. |
| 2006/0289648 | A1 | 12/2006 | Shafer et al. |
| 2009/0254639 | A1 | 10/2009 | Manchester |

FOREIGN PATENT DOCUMENTS

| | | |
|---|---|---|
| CN | 1452390 | 10/2003 |
| CN | 1638345 | 7/2005 |
| CN | 1761256 | 4/2006 |
| CN | 1783812 | 6/2006 |
| CN | 1818888 | 8/2006 |
| CN | 1638344 | 11/2010 |
| EP | 0597640 | 5/1994 |
| EP | 0848560 | 6/1998 |
| EP | 1071295 | 1/2001 |
| EP | 1445908 | 8/2004 |
| EP | 1499067 | 1/2005 |
| EP | 1553729 | 7/2005 |
| EP | 1622337 | 2/2006 |
| EP | 1640846 | 3/2006 |
| JP | 2000069084 | 3/2000 |
| JP | 2002318788 | 10/2002 |
| JP | 2003198568 | 7/2003 |
| JP | 2003199982 | 7/2003 |
| JP | 2003204335 | 7/2003 |
| JP | 2003271482 | 9/2003 |
| JP | 2004007351 | 1/2004 |
| JP | 2004021581 | 1/2004 |
| JP | 200496146 | 3/2004 |
| JP | 2004096146 | 3/2004 |
| JP | 2005045557 | 2/2005 |
| JP | 2005085047 | 3/2005 |
| JP | 2005210713 | 4/2005 |
| JP | 2005216292 | 8/2005 |
| JP | 2006-099776 | 4/2006 |
| JP | 2006107453 | 4/2006 |
| JP | 2009503695 | 1/2009 |
| KR | 1020010021111 | 3/2001 |
| KR | 1020010043648 | 5/2001 |
| KR | 0060538 | 6/2006 |
| TW | 200720937 | 6/2007 |
| WO | WO-9921313 | 4/1999 |
| WO | WO-9933301 | 7/1999 |
| WO | WO-9939480 | 8/1999 |
| WO | WO-9945672 | 9/1999 |
| WO | WO-9950999 | 10/1999 |
| WO | WO-0010357 | 2/2000 |
| WO | WO-0180522 | 10/2001 |
| WO | WO-03034686 | 4/2003 |
| WO | WO-03053008 | 6/2003 |
| WO | WO-0309222 | 11/2003 |
| WO | WO-03092222 | 11/2003 |
| WO | WO-2004058403 | 7/2004 |
| WO | WO-2005074227 | 8/2005 |
| WO | WO-03026255 | 3/2006 |
| WO | WO-07016298 | 2/2007 |

OTHER PUBLICATIONS

"Advanced Audio Distribution Profile Specification Adopted Version 1.0", (May 22, 2003), 75 pages.

"Advisory Action", U.S. Appl. No. 10/806,772, (Apr. 18, 2008), 3 pages.

"Advisory Action", U.S. Appl. No. 10/807,095, (Feb. 27, 2009), 3 pages.

"Advisory Action", U.S. Appl. No. 11/000,130, (Jun. 3, 2008), 4 pages.

"Advisory Action", U.S. Appl. No. 11/060,290, (May 4, 2009), 4 pages.

"Biometric Drives Featured Products", http://www.cpustuff.com/flashdrive.html, available at <http://web.archive.org/web/20040626073843/http://www.cpustuff.com/flashdrive.html>,(2004), pp. 1-3.

"Biometric External Devices Featured Products", http://www.cpustuff.com/biometric_external.htm, available at <http://web.archive.org/web/20040803015745/http://www.cpustuff.com/biometric_external.htm>,(2004), 3 pages.

"Creative Nomad MuVo NX, Features and Benefits", http://nomadworld.com/products/muvo_nx/features.asp, available at <http://web.archive.org/web/20030806225222/http://www.nomadworld.com/products/MuVo_NX/features.asp>,(2003), pp. 1-2.

"Final Office Action", U.S. Appl. No. 10/806,772, (Dec. 26, 2007), 24 pages.

"Final Office Action", U.S. Appl. No. 10/806,836, (Oct. 15, 2008), 14 pages.

"Final Office Action", U.S. Appl. No. 10/807,095, (Nov. 13, 2008), 18 pages.

"Final Office Action", U.S. Appl. No. 10/951,547, (Jan. 30, 2008), 19 pages.

"Final Office Action", U.S. Appl. No. 10/975,666, (Nov. 17, 2008), 52 pages.

"Final Office Action", U.S. Appl. No. 10/975,666, (Dec. 27, 2007), 41 pages.

"Final Office Action", U.S. Appl. No. 11/000,130, (Feb. 20, 2008), 7 pages.

"Final Office Action", U.S. Appl. No. 11/000,130, (Oct. 27, 2009), 25 pages.

"Final Office Action", U.S. Appl. No. 11/060,290, (Nov. 06, 2008), 12 pages.

"Final Office Action", U.S. Appl. No. 11/192,291, (Oct. 17, 2008), 34 pages.

"Foreign Office Action", Japanese Application No. 2005-002843, (Apr. 28, 2011), 11 pages.

"Foreign Office Action", Japanese Application No. 2005-002844, (Nov. 2, 2010), 4 pages.

"Foreign Office Action", Japanese Application No. 2005-002844, (Apr. 12, 2011), 3 pages.

"Foreign Office Action", Japanese Application No. 2005-002845, (Mar. 24, 2011), 3 pages.

"Foreign Office Action", Japanese Application No. 2005-223307, (May 6, 2011), 9 pages.

"Foreign Office Action", Japanese Patent Application 2005-002845, (Dec. 13, 2010), 6 pages.

"Foreign Office Action", Korean Application No. 10-2005-0001617, (Mar. 10, 2011), 5 pages.

"Foreign Office Action", Korean Application No. 10-2005-0001656, (Mar. 15, 2011), 7 pages.

"Foreign Office Action", Korean Application No. 10-2005-0001838, (Mar. 20, 2011), 7 pages.

"Gemlus, GemClub-Memo,", http://www.gemplus.com/products/gemclub_memo/(1998), pp. 1-3.

"Gemplus, Chipware", http://www.gemplus.com/techno/chipware/index.html, available at <http://wayback.archive.org/web/20030601000000*/http://www.gemplus.com/techno/chipware/index.html>,(2003), 1 page.

"Gemplus, GPM8K", http://www.gemplus.com/products/gpm8k/index.html, available at <http://web.archive.org/web/20020327144435/http://www.gemplus.com/products/gpm8k/index.html>,(2002), pp. 1-2.

"IBM 8MB USB Memory Key—Users Guide", (Dec. 2000), 66 pages.

"Integrating SunRay 1 Enterprise Appliances and Microsoft Windows NT", *Sun Microsystems, Inc.; Palo Alto, California*, (2000), 24 pages.

"Linksys Instant Wireless USB Network Adapter WUSB11 Network Adapter", *Product Review; http://hardwarecentral.dealtime.com/xPR_Linksys_Instant_Wireless_WUSB11*, (2004), pp. 1-4.

"Merriam Webster OnLine Dictionary—Definition of Biometrics", retrieved from <www.merriam-webster.com/dictionary/biometrics> on Jun. 4, 2007, 1 page.

"Non Final Office Action", U.S. Appl. No. 10/806,331, (Nov. 25, 2008), 6 pages.

"Non Final Office Action", U.S. Appl. No. 10/806,369, (Jan. 18, 2008), 9 pages.

"Non Final Office Action", U.S. Appl. No. 10/806,369, (Sep. 13, 2007), 10 pages.

"Non Final Office Action", U.S. Appl. No. 10/806,772, (Jul. 2, 2007), 17 pages.

"Non Final Office Action", U.S. Appl. No. 10/806,836, (Mar. 25, 2009), 15 pages.

"Non Final Office Action", U.S. Appl. No. No. 10/806,836, (Oct. 22, 2007), 15 pages.

"Non Final Office Action", U.S. Appl. No. 10/807,095, (Jan. 28, 2008), 17 pages.

"Non Final Office Action", U.S. Appl. No. 10/807,095, (Jul. 27, 2009), 18 pages.
"Non Final Office Action", U.S. Appl. No. 10/951,547, (Jun. 25, 2007), 22 pages.
"Non Final Office Action", U.S. Appl. No. 10/967,368, (Jul. 17, 2008), 14 pages.
"Non Final Office Action", U.S. Appl. No. 10/967,368, (Aug. 19, 2009), 5 pages.
"Non Final Office Action", U.S. Appl. No. 10/975,666, (May 27, 2008), 31 pages.
"Non Final Office Action", U.S. Appl. No. 10/975,666, (Jun. 21, 2007), 21 pages.
"Non Final Office Action", U.S. Appl. No. 10/999,594, (Jun. 12, 2008), 9 pages.
"Non Final Office Action", U.S. Appl. No. 11/000,130, (May 29, 2009), 18 pages.
"Non Final Office Action", U.S. Appl. No. 11/000,130, (Sep. 11, 2007), 14 pages.
"Non Final Office Action", U.S. Appl. No. 11/000,130, (Nov. 12, 2008), 9 pages.
"Non Final Office Action", U.S. Appl. No. 11/060,290, (Jan. 23, 2008), 10 pages.
"Non Final Office Action", U.S. Appl. No. 11/060,290, (Dec. 14, 2009), 11 pages.
"Non Final Office Action", U.S. Appl. No. 11/192,291, (Mar. 31, 2008), 26 pages.
"Non Final Office Action", U.S. Appl. No. 11/192,291, (Jun. 23, 2009), 8 pages.
"Non Final Office Action", U.S. Appl. No. 11/192,291, (Sep. 20, 2007), 19 pages.
"Notice of Allowance & Examiner's Amendment", U.S. Appl. No. 11/000,130, (Mar. 10, 2010), 16 pages.
"Notice of Allowance & Examiner's Amendment", U.S. Appl. No. 11/060,290, (Jul. 7, 2010), 9 pages.
"Notice of Allowance", U.S. Appl. No. 10/806,331, (Sep. 15, 2009), 4 pages.
"Notice of Allowance", U.S. Appl. No. 10/806,369, (Feb. 2, 2009), 10 pages.
"Notice of Allowance", U.S. Appl. No. 10/967,368, (May 1, 2009), 6 pages.
"Notice of Allowance", U.S. Appl. No. 10/967,368, (Dec. 8, 2009), 6 pages.
"Notice of Allowance", U.S. Appl. No. 10/975,666, (Apr. 14, 2010), 4 pages.
"Notice of Allowance", U.S. Appl. No. 10/999,594, (Dec. 2, 2008), 3 pages.
"Notice of Allowance", U.S. Appl. No. 10/999,594, (Dec. 29, 2008), 5 pages.
"Notice of Allowance", U.S. Appl. No. 11/192,291, (Feb. 23, 2010), 6 pages.
"Notice of Allowance", U.S. Appl. No. 12/422,750, (Jan. 25, 2011), 2 pages.
"Notice of Allowance", U.S. Appl. No. 12/422,750, (Dec. 16, 2010), 12 pages.
"Restriction Requirement", U.S. Appl. No. 10/806,331, (Jul. 18, 2008), 5 pages.
"Restriction Requirement", U.S. Appl. No. 10/967,368, (Jan. 8, 2009), 5 pages.
"Smart Cards for Temporary Facilities Security", *Information Methods Incorporated Group, LLC*, (Jan. 2004), pp. 1-16.
"Software Solutions: Networked Solutions", *Nexware Corporation; Nexwarecorp.com*, (2001), 1 page.
"Sun Ray Interoperability Brief", *Sun Microsystems, Inc.; Santa Clara, California*, (Aug. 2003), 14 pages.
"Sun Ray Overview", *Sun Microsystems, Inc.; Santa Clara, California*, (Apr. 2003), 28 pages.
"Sun Ray", *Editor's Choice Communication Solutions*;http://www.tmcnet.com/comsol/0601/0601lab2.htm, (Jun. 2004), 8 pages.
"Trekstor USA, Thumbdrive(TM) Secure details", *TREKSTOR USA*, retrieved from <http://www.trekstorusa.com/thumbdrive_secure.htm> on May 19, 2011, pp. 1-2.
"Universal Serial Bus Device Class Definition for Audio Data Formats Release 1.0", (Mar. 18, 1998), 31 pages.

"USB Flash Drive FAQ", http:www.usbflashdrive.org/usbfd_faq.html, available at <http://web.archive.org/web/2004021403704/http://www.usbflashdrive.org/usbfd_faq.html>,(2004), pp. 1-6.
"Using Smart Cards With the Sun Ray 1 Enterprise Appliance", *Revision 01, Palo Alto, California*, (Sep. 1999), 19 pages.
"Webopedia, EEPROM", retrieved from <http://www.webopedia.com/TERM/E/EEPROM.html> on Mar. 24, 2008,(Jul. 29, 2003), 3 pages.
"Wi-Fi Protected Access: Strong, standards-based, interoperable security for today's Wi-Fi networks", (Apr. 29, 2003), 10 pages.
"Xreferplus, Webster's New World Computer Dictionary—Biometric Authentication", www.xreferplus.com, Wiley Publishing, Inc., (2003), 1 page.
Abraham, Dalen M., et al., "U.S. Appl. No. 60/534,795", (Jan. 7, 2004), 45 pages.
Baillie, David et al., "The Networked Digital Home", *Soundscapes Info; retrieved Mar. 29, 2004 from* http://icce.rug.nl/~soundscapes/VOLUME05/LSI-mediacast.html. (2002), 3 pages.
Balfanz, Dirk et al., "Talking to Strangers: Authentication in Ad-Hoc Wireless Networks", *In Symposium on Network and Distributed Systems Security*, San Diego, CA; http://citeseer.ist.psu.edu/balfanz02talking.htm. (Mar. 11, 2002), 14 pages.
Barton, John et al., "Making Computers Disappear: Appliance Data Services", *Mobilcom 2001*, (Jan. 29, 2001), 16 pages.
Box, Don "Code Name Indigo: A Guide to Developing and Running Connected Systems with Indigo", *Microsoft Corporation*, http://msdn.microsoft.com/msdnmag/issues/04/01/indigo/!print=true, (2004), 11 pages.
Chappell, David "Introducing Indigo: An Early Look", *Microsoft Corporation*; http://msdn:microsoft.com/library/en-us/dnIong/html/introindigov1-0.asp?frame=true, (Feb. 2005), 18 pages.
Corbett, Christopher J., et al., "U.S. Appl. No. 60/592,506", (Jul. 30, 2004), 39 pages.
Draves, F "Default Address Selection for Internet Protocol Version 6 (IPv6)", *The Internet Society 2003*—http://www.ietf.org/rfc/rfc/rfc3438.txt, (2003), 24 pages.
Finlayson, Ross S., et al., "Log Files: An Extended File Service Exploiting Write-Once Storage", *ACM*, (Sep. 1987), 14 pages.
Fryburg, "Treatment of the insulin resistance syndrome", U.S. Appl. No. 60/292,506, filed May 21, 2001, 54 pages.
Harkins, D et al., "The Internet Key Exchange (IKE)", *Network Working Group RFC 2409*, (Nov. 1998), 39 pages.
Kent, S et al., "IP Authentication Header", *Network Working Group RFC 2402*, (Nov. 1998), 23 pages.
Kent, S et al., "IP Encapsulating Security Payload (ESP)", *Network Working Group RFC 2406*, (Nov. 1998), 16 pages.
Khaled, Saadi S., "Quorum Consensus Protocol Tailored for the Client/Server Architecture", (Oct. 1993), 162 pages.
Maitland, "Okapi Unlocks iSCSI", http://byteandswitch.com/document.asp?doc_id=19173, (2003-2004) , 3 pages.
Olson, Daniel "Using XML Based Configuration File in Windows Form Applications", (Apr. 15, 2002), 3 pages.
Rescorla, E "Diffie-Hellman Key Agreement Method",*Network Working Group RFC 2631*, (Jun. 1999), 13 pages.
Schroder, Carla "USB Pen Drives: Large, Portable Storage in a Tiny Package", http://networking.earthweb.com/nethub/article.php, (Dec. 2003), 3 pages.
Verma, Dinesh et al., "Policy based SLA Management in Enterprise Networks", *IBM Thomas J Watson Research Center*, (2001), 16 pages.
Wakefield, Michael "Wireless Technology and Your Mobile Device", *slides provided with webcast; printed on* Oct. 31, 2002, 61 pages.
Wakerfield, Michael "Wireless Technology and Your Mobile Device", *Microsoft Support WebCase, transcript*; http://support.microsoft.com/default.aspx!acid+%2Fservicedesks%2Fwebcasts%2Fen%2Fwc103102.asp; printed Oct. 31, 2002, 13 pages.
Ylisaukko-Oja, Arto et al., "Low Capacity Wireless Home Networks—Cheap and Simple Interconnections between Devices", *Version 1.0, Olkk Korhonen*(May 2002), 11 pages.
"Advisory Action", U.S. Appl. No. 10/999,555, (Jun. 1, 2009), 3 pages.

"Cisco 800 Fast Step Software Design Guide—Introduction to Design", Available at <ftp://ftp.cisco.com/pub/netmgmt/faststep/Cisco-Fast-Step-800-Design-Guide-v2.5.pdf>,(May 29, 2000), 4 pages.

"Cisco 800 Fast Step Software Design Guide", *Cisco 800 Fast Step Software Version 2.5*, (May 29, 2000), 50 pages.

"Core", *Specification of the Bluetooth System, vol. 1, v1.0 B*, available at <http://grouper.ieee.org/groups/802/15/Bluetooth/core_10_b.pdf>,(Dec. 1, 1999),pp. 1-1082.

"EP Search Opinion", EP Application 05107023.3, (Nov. 7, 2005), 5 pages.

"ETSI Digital Cellular Telecommunications System (Phase 2+): Terminal Equipment to Mobile Station (TE-MS) Multiplexer Protocol", *Global System for Mobile Communications*, vol. 101, No. 369, available at <http://www.etsi.org/deliver/etsi_ts/101300_101399/101369/06.04.00_60/ts_101369v060400p.pdf>,(1997), 55 pages.

"European Search Report", EP Application 05000083.5, (Mar. 4, 2005), 3 pages.

"European Search Report", EP Application 05107023, (Nov. 7, 2005), 2 pages.

"Final Office Action", Application No. 10/870,626, (Apr. 23, 2008), 13 pages.

"Final Office Action", Application No. 10/999,555, (Feb. 20, 2009), 13 pages.

"Foreign Notice of Allowance", Chinese Application No. 200510004053.1, (Jun. 13, 2010), 4 pages.

"Foreign Notice of Allowance", European Application No. 05000086.8, (Feb. 12, 2007), 6 pages.

"Foreign Notice of Allowance", Japanese Application No. 2005-002845, (May 12, 2011), 4 pages.

"Foreign Office Action", Chinese Application No. 200510004054.6, (Feb. 6, 2009), 7 pages.

"Foreign Office Action", Chinese Application No. 200510004054.6, (Jan. 8, 2010), 14 pages.

"Foreign Office Action", Chinese Application No. 200510119933.3, (Apr. 10, 2009), 20 pages.

"Foreign Office Action", EP Application 05000083.5, (Dec. 27, 2005), 9 pages.

"Foreign Office Action", Japanese Application 2005-002845, (Dec. 13, 2010), 12 pages.

"Foreign Office Action", Japanese Application No. 2005-002843, (Aug. 12, 2011), 6 pages.

"Foreign Office Action", Japanese Application No. 2005-002843, (Apr. 28, 2011), 11 pages.

"Foreign Office Action", Japanese Application No. 2005-223307, (Jul. 29, 2011), 8 pages.

"Foreign Office Action", Korean Application No. 10-2005-0069548, (Aug. 23, 2011), 6 pages.

"Foreign Office Action", Korean Application No. 10-2005-1656, (May 9, 2011), 7 pages.

"IEEE Standard for Wireless LAN Medium Access Control (MAC) and Physical Layer (PHY) Specifications", *IEEE Standard 802.11*, available at <http://standards,ieee.org/findstds/errata/802.11a-errata.pdf>, (1999), 14 pages.

"Interoperability Requirements for Bluetooth as a WAP Bearer", *Specification of the Bluetooth System, vol. 1, v1.0 B*, available at <http://grouper.ieee.org/groups/802/15/Bluetooth/core_10_b.pdf>, (Dec. 1, 1999).

"Introduction to Design", *Cisco; Configuration Scenarios*, (Sep. 28, 2002), 4 pages.

"Non-Final Office Action", U.S. Appl. No. 09/954,087, (Mar. 16, 2004), 6 pages.

"Non-Final Office Action", U.S. Appl. No. 09/954,087, (Sep. 16, 2005), 7 pages.

"Non-Final Office Action", U.S. Appl. No. 10/870,626, (Nov. 2, 2007), 8 pages.

"Non-Final Office Action", U.S. Appl. No. 10/806,369, (Sep. 13, 2007), 10 pages.

"Non-Final Office Action", U.S. Appl. No. 10/999,555, (May 1, 2008), 12 pages.

"Non-Final Office Action", U.S. Appl. No. 10/999,555, (Aug. 10, 2009), 9 pages.

"Notice of Allowance", U.S. Appl. No. 09/954,087, (Jul. 19, 2006), 4 pages.

"Notice of Allowance", U.S. Appl. No. 09/954,087, (Jul. 20, 2004), 4 pages.

"Notice of Allowance", U.S. Appl. No. 10/870,626, (Aug. 13, 2008), 4 pages.

"Notice of Allowance", U.S. Appl. No. 10/999,555, (Mar. 25, 2010), 6 pages.

"Partial European Search Report", European Application No. 05000081.9, (Aug. 2, 2011), 6 pages.

"Profiles", *Specification of the Bluetooth System, vol. 2, v1.0 B*, available at <http://grouper.ieee.org/groups/802/15/Bluetooth/profile_10_b.pdf>,(Dec. 1, 1999),pp. 1-440.

"Remote NDIS Specification Rev. 1.1", available at <http://www.google.com/url!sa=t&source=web&cd=1&ved=0CBwQFjAA&url=http%3A%2 F%2Fuser.chol.com%2Fsmarty%2Fbbs%2Fdownload.php%3Fid%3Dascbbs%26b%3Dhomewinpgm%26uid%3D138%26fn%3D1&ei=retfToWiJcnnsQLJ4sVB&usg=AFQjCNFk BSUeQMRzb-U1UcXAjPIzGP0RtA&sig2,(Aug. 9, 2002), 42 pages.

"Sun Ray", *Editors Choice Communication Solutions*; http://www.tmcnet.com/comsol/0601/0601|ab2.htm, (Jun. 2001), 8 pages.

"The Cable Guy—The New Wireless Network Setup Wizard in Windows XP Service Pack 2", Retrieved from: <http://www.microsoft.com/technet/community/columns/cableguy/cg0604.mspx> on Jan. 3, 2005,(May 25, 2004), 8 pages.

"UPnP Device Architecture 1.0", *UPnP Forum*, available at <http://www.upnp.org/specs/arch/UPnP-arch-DeviceArchitecture-v1.0-20080424.pdf>,(Jun. 2000), 80 pages.

Ayyagari, Arun et al., "IEEE 802.11 Quality of Service—White Paper", *IEEE P802.11 Wireless LANs*, available at <https://docs.google.com/viewer!url=https%3A%2F%2Fmentor.ieee.org%2F802.11%2Fdcn%2F00%2F11-00-0028-00-000e-ieee-802-11-quality-of-service-white-paper.doc>,(Feb. 15, 2000), 10 pages.

Bahl, Paramvir "Enhancing the Windows Network Device Interface Specification for Wireless Networking", *Submitted to the IEEE OpenArch 2001, Fairbanks, Alaska*, available at <http://research.microsoft.com/en-us/um/people/bahl/papers/pdf/paper_on_ndis_extensions.pdf<, (2000), 10 pages.

Bahl, Victor et al., "Enhancing the Windows Network Device Interface Specification for Wireless Networking", *Microsoft Research Technical Report, MSR-TR-2000-84.*, available at <http://research.microsoft.com/en-us/um/people/bahl/Papers/Pdf/MSR-TR-2000-84.pdf>, (Aug. 2000), 43 pages.

Bahl, Victor et al., "The CHOICE Network: Broadband Wireless Internet Access in Public Places", *Microsoft Research Technical Report, MSR-TR-2000-21*, available at <http://research.microsoft.com/pubs/69805/tr-2000-21.pdf>,(Feb. 2000), 13 pages.

Bhagwat, Pravin "Networking over Bluetooth: Overview and Issues", *IAB Wireless Workshop. Feb. 29-Mar. 2, 2000. Sunnyvale, CA*, available at <http://www.iab.org/wp-content/IAB-uploads/2011/03/BT-overview.ppt>,(Feb. 29, 2000), 48 pages.

Broch, Josh et al., "Supporting Hierarchy and Heterogeneous Interfaces in MultiHop Wireless Ad Hoc Networks", *Proceedings of the Workshop on Mobile Computing, I-SPAN.*, available at <http://www.google.com/url!sa=t&source=web&cd=1&ved=0CB4QFjAA&url=http%3A%2F%2Fwww.ieft.org%2Fproceedings%2F45%2Fslides%2Fmanet-broch-99jul.pdf&ei=eblfTqmkM8yFsAKpx8wS&usg=AFQjCNGPNxnXeZL5p73KuRcYYyo0OU_SCA&sig2=YYOCReey9xN1zMgQJA9OcA>,(1999), 6 pages.

Cant, Chris "Windows Driver Model (WDM) Device Drivers", *PHD Computer Consultants Ltd*., available at <http://www.phdcc.com/wdmarticle.html>,(1999), 12 pages.

Enns, Rob "Abstract: XML-based Network Management", *Juniper Networks*, Retrieved from: <www.nanog.org/meetings/nanog23/presentations/enns.ppt>on Mar. 2, 2005,(Oct. 21, 2001), pp. 1-4.

Fleming, Kris et al., "Architectural Overview of Intel's Bluetooth Software Stack", *Intel Technology Journal, Q2*, available at <http://download.intel.com/technology/itj/q22000/pdf/art_2.pdf>,(2000), pp. 1-10.

Haartsen, Jaap "Bluetooth: A New Radio Interface Providing Ubiquitous Connectivity", *Proceeding of the IEEE*, Oct. 2000, available at <http://www.cs.nccu.edu.tx/~ttsai/mobilecomm_ttsai/bluetooth/haartsen.pdf>,(Oct. 2000), 5 pages.

Haartsen, Jaap et al., "Bluetooth—A New Low-Power Radio Interface Providing Short-Range Connectivity", *Proceedings of the IEEE*, vol. 88, No. 10, available at <http://www.google.com/url!sa=t&source=web&cd=1&ved=0CBkQFjAA&url=http%3A%2F%2Fciteseerx.ist.psu.edu%2Fviewdoc%2Fdownload%3Fdoi%3D10.1.1.24.2573%26rep%3Drep1%26type%3Dpdf%rct=j&q=Bluetooth%20A%20new%20low-power%20radio%20interface%20providing%,(Oct. 2000), pp. 1651-1661.

Hall, Martin et al., "Programming with Sockets", *Windows Sockets: An Open Interface for Network Programming under Microsoft Windows. Version 1.1*, Jan. 20, 1993, available at <http://www.sockets.com/winsock.htm#ProgrammingWithSockets>,(Jan. 20, 1993), 14 pages.

Kardach, James "Bluetooth Architecture Overview", *Intel Technology Journal Q2*, available at <http://download.intel.com/technology/itj/q22000/pdf/art_.pdf>,(2000), 7 pages.

Maitland, "Okapi Unlocks iSCSI", http://byteandswitch.com/document.asp!doc_id=19173, (Jul. 30, 2002), 4 pages.

Megowan, Pat et al., "IrDA Object Exchange Protocol—IrOBEX", *Counterpoint Systems Foundry, Inc. Microsoft Corporation. Version 1.2*, available at <http://netwinder.orgonstate.edu/pub/netwinder/docs/nw/irda/IrOBEX12.pdf>,(Mar. 18, 1999), 85 pages.

Mettala, Riku "Bluetooth Protocol Architecture Version 1.0", *Bluetooth White Paper*, available at <http://srohit.tripod.com/bluetooth_sec.pdf>,(Aug. 25, 1999), 20 pages.

Miller, Brent "Mapping Salutation Architecture APIs to Bluetooth Service Discovery Layer", *Version 1.0*, available at <Mapping Salutation Architecture APIs to Bluetooth Service Discovery Layer>,(Jul. 1, 1999), 26 pages.

Miu, Allen et al., "The Choice Network: Dynamic Host Configuration for Managing Mobility between Public and Private Networks", *Microsoft Research Technical Report* MSR-TR-2000/85, available at <http://citeseerx.ist.psu.edu/viewdoc/download!doi=10.1.1.91.4038&rep=rep1&type=pdf>,(Aug. 2000), 14 pages.

Richard, Golden I., "Service Advertisement and Discovery: Enabling Universal Device Cooperation", *IEEE Internet Computing*, available at <http://cs.uno.edu/~golden/Stuff/service.pdf>,(Sep. 2000), pp. 18-26.

Sobrinho, Joao L., "Quality-of-Service in Ad Hoc Carrier Sense Multiple Access Wireless Networks", *IEEE Journal on Selected Areas in Communications, vol. 17, No. 8, Aug. 1999, available at <http://www.ceid.upatras.gr/faculty/manos/courses/mobnets/papers_site/papers/CSMA.pdf>*,(Aug. 1999), pp. 1353-1368.

Wakefield, Michael "Wireless Technology and Your Mobile Device", *Microsoft Support WebCase, transcript*; http://support.microsoft.com/default.aspx!acid+%2Fservicedesks%2Fwebcasts%2Fen%2Fwc103102.asp; printed Oct. 31, 2002, 13 pages.

Weinmiller, Jost et al., "Analyzing and Improving the IEEE 802.11-MAC Protocol for Wireless LANs", *Proceedings of MASCOTS '96*, available at <http://citeseerx.ist.psu.edu/viewdoc/download!doi=10.1.1.37.6416&rep=rep1&type=ps>, (1996), 7 pages.

Ylisaukko-Oja, Arto et al., "Low Capacity Wireless Home Networks—Cheap and Simple Interconnections between Devices", *Version 1.0, Olkk Korhonen*, (May 2002), 20 pages.

"Foreign Office Action", Japanese Application No. 2005-223307, (Jan. 17, 2012),7 pages.

"Additional European Search Report", European Patent Application Number 05000081.9, (Dec. 19, 2011), 8 pages.

"Foreign Office Action", Chinese Application No. 200680027492.7, (Jan. 5, 2012), 6 pages .

"Foreign Office Action", Japanese Application No. 2008-524171, (Jan. 6, 2012), 5 pages.

"Foreign Office Action", Korean Application No. 10-2005-0001656, (Dec. 2, 2011), 4 pages "Leading Trends: HDTV Emerging All Over the World—Wireless Network UWB is Close to Practical Use; Mesh is also on the Horizon for Communication between Rooms", Nikkei Electronics, No. 892, Nikkei Business Publications, Inc.,(Jan. 31, 2005), pp. 68-72.

"Taiwan Search Report", Taiwan Application No. 093139880, (Nov. 29, 2011), 7 pages.

"Z-COM/ZDC XG-3120 11g Enterprise AP", Ciudadwireless Informatica Y Telecomunicaciones, Retrieved from: <http://www.ciudadwireless.com/z-com_xg-3120_enterprise-p-626.htm>on Nov. 18, 2011,(Mar. 23, 2003), 3 pages.

"First Office Action", Chinese Application No. 200680027492.7, (Oct. 23, 2009), 12 pages.

"Foreign Office Action", AU Application No. 2004240251, (Feb. 4, 2009), 26 pages.

"Foreign Office Action", Chinese Application No. 200510004053.1, (Mar. 14, 2008), 15 pages.

"Foreign Office Action", Chinese Application No. 200510095938.7, (Feb. 1, 2008), 25 pages.

"Foreign Office Action", Chinese Application No. 200510119933.3, (Nov. 7, 2008), 9 pages.

"Foreign Office Action", Chinese Application No. 200510128385.0, (Jul. 4, 2008), 10 pages.

"Foreign Office Action", EP Application No. 05107023.3, (Jun. 24, 2009), 7 pages.

"Foreign Office Action", EP Application No. 05107023.3, (Sep. 27, 2006), 6 pages.

"International Search Report", Application No. PCT/US2006/029322, (Oct. 17, 2007), 2 pages.

"Notice of Allowance", Korean Application No. 10-2005-7009156, (Oct. 28, 2011), 6 pages.

\* cited by examiner

CONFIGURING NETWORK SETTINGS USING PORTABLE STORAGE MEDIA

This application is a continuation of and claims priority under 35 U.S.C. §120 to U.S. patent application Ser. No. 12/422,750 filed on Apr. 13, 2009 and titled "Configuring Network Settings Using Portable Storage Media," which is a continuation of U.S. application Ser. No. 10/806,369, filed Mar. 23, 2004 and titled "Configuring Network Settings Using Portable Storage Media," which claims the benefit of U.S. Provisional Patent Application No. 60/534,795 filed Jan. 7, 2004, the entire disclosures of which are incorporated herein by reference.

BACKGROUND

The use of data communication networks continues to grow. In small as well as large corporate settings, wired local area networks (LANs) and wide area networks (WANs) have become an established feature of conducting business, and wireless networks are being increasingly employed. The use of network technology in the home, both wired and wireless, is a more recent phenomenon and has been slower to develop. In addition to facilitating Internet connectivity, home networking permits personal computing devices and various consumer electronic devices and appliances within the home to communicate with each other. Wireless technology, such as IEEE 802.11 wireless networks and networks of Bluetooth-enabled devices, is attractive in home as well as corporate environments for reasons of convenience, mobility and flexibility.

A principal impediment to the wider adoption of networking technology in the home and other non-corporate environments has been the difficulty experienced by non-expert users in configuring network devices. For example, it can be troublesome for such users to configure a device to function as a wireless access point (WAP). Setting up an ad hoc wireless network of peer devices (such as wireless PCs, wireless printers, and PDAs) is also typically a complex task. Each peer device must have the same network settings, and a secure ad hoc network typically requires each peer device to have a common WEP key, which must be communicated to the user of the peer device and entered manually. Thin client devices, such as digital audio receivers and wireless printers, which comprise an increasing number of home network devices, are particularly laborious to configure for network connectivity because they lack the convenient and intuitive I/O capabilities of conventional personal computers.

SUMMARY

A portable computer-readable media device is used to configure network devices to allow network functionality and connectivity. In an embodiment, a configuration application generates, or aids the user in generating, network settings such as wireless configuration settings, LAN settings, and WAN settings. These settings are determined from the operating system or through user input. The configuration application then generates an Extensible Markup Language (XML) file embodying the network settings and writes that file to the portable computer-readable media device. A user may then install the portable computer-readable media device in one or more other network devices to automatically transfer the configuration to those network devices. In one embodiment, a wireless device may be provisioned with the wireless configuration settings necessary to join a wireless network, without requiring the user to manually enter the network settings.

In a further embodiment, a method of provisioning a network device with network settings comprises the steps of determining a network settings configuration for allowing the network device to join a network, wherein the network settings configuration includes at least a network name and a network encryption key; generating an XML file including the network settings configuration; and writing the XML file to a portable computer-readable media device. In one permutation of this embodiment, the network encryption key is automatically generated so that a user does not have to enter a lengthy encryption key manually through a user interface.

As noted above, the network settings configuration is determined in an embodiment by collecting data from a user through a user interface. In another embodiment, the network settings configuration is determined at least in part by using an application program interface (API) of an operating system to determine network settings such as wireless configuration, LAN settings, and Internet Protocol (IP) settings.

In another embodiment, data stored on a portable computer-readable media device for provisioning a device with network settings comprises an XML file containing a network settings configuration for configuring the device to join a network, and an autorun file for prompting the device to apply the network settings configuration. In this embodiment, the network settings include at least one of (1) wireless configuration settings, (2) LAN settings, (3) WAN settings, and (4) broadband modem settings. The data stored on the portable computer-readable media device can also include multiple versions of the network settings configuration, corresponding to different networks. Still further, the data stored on the portable computer-readable media device can include a device configuration file describing configured devices.

In accordance with one or more embodiments, the data stored on the portable computer-readable media device further includes an application for configuring the portable computer-readable media device, wherein the application executes on a computer to which the portable computer-readable media device is connected. In another embodiment, a method of configuring a device for operation in a network comprises detecting the installation of a portable computer-readable media device; uploading a configuration from the portable computer-readable media device, wherein the configuration includes network settings, device configuration information, security information, and file sharing information; applying the configuration; and joining the network. In this embodiment, the configuration is again embodied in an XML file stored on the portable computer-readable media device.

Additional details regarding techniques for configuring network devices with a portable media device can be found in the following detailed description which proceeds with reference to the accompanying figures.

BRIEF DESCRIPTION OF THE DRAWINGS

While the appended claims set forth claimed features with particularity, the claimed features are best understood from the following detailed description taken in conjunction with the accompanying drawings, of which:

DETAILED DESCRIPTION

Methods and systems for configuring network devices with a portable media device will now be described with respect to certain embodiments. The skilled artisan will readily appreciate that the methods and systems described herein are merely exemplary and that variations can be made without departing from the spirit and scope of the described techniques.

Techniques for configuring network devices with a portable media device will be more completely understood through the following detailed description, which should be read in conjunction with the attached drawings. In this description, like numbers refer to similar elements within various embodiments. Aspects of the described techniques are illustrated as being implemented in a suitable computing environment. Although not required, certain aspects will be described in the general context of computer-executable instructions, such as procedures, being executed by a personal computer. Generally, procedures include program modules, routines, functions, programs, objects, components, data structures, etc. that perform particular tasks or implement particular abstract data types. Moreover, those skilled in the art will appreciate that the described techniques may be practiced with other computer system configurations, including hand-held devices, multi-processor systems, and microprocessor-based or programmable consumer electronics devices. The described techniques may also be practiced in distributed computing environments where tasks are performed by remote processing devices that are linked through a communications network. In a distributed computing environment, program modules may be located in both local and remote memory storage devices. The term computer system may be used to refer to a system of computers such as may be found in a distributed computing environment.

Figure 1:
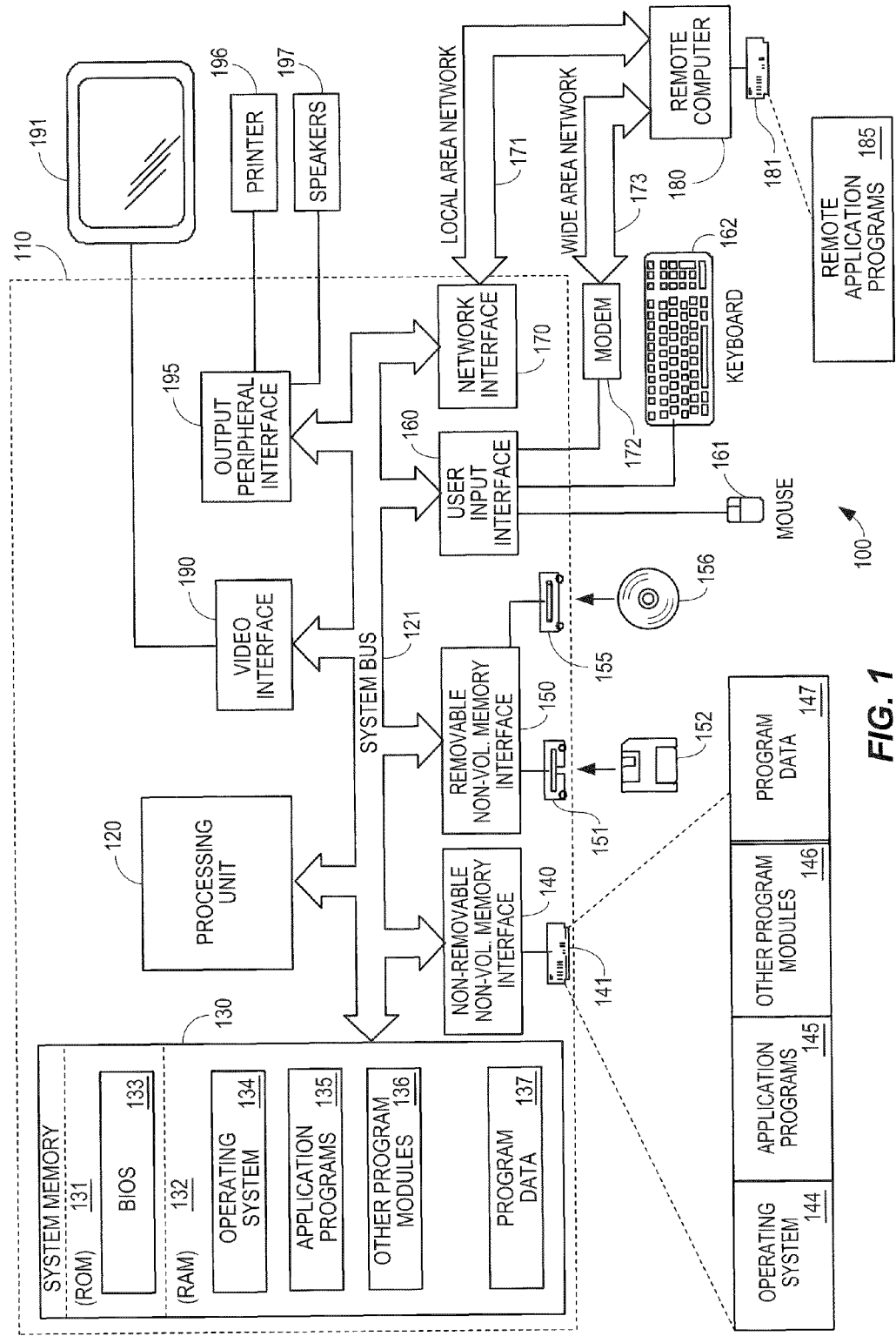
FIG. 1 is a simplified schematic diagram illustrating an exemplary architecture of a computing device for carrying out the configuration of a computer network in accordance with one embodiment.

FIG. 1 illustrates an example of a suitable computing system environment 100 in accordance with one or more embodiments. The computing system environment 100 is only one example of a suitable computing environment and is not intended to suggest any limitation as to the scope of the claimed subject matter. Neither should the computing environment 100 be interpreted as having any dependency or requirement relating to any one or combination of components illustrated in the exemplary operating environment 100. Although at least one embodiment does include each component illustrated in the exemplary operating environment 100, another more typical embodiment excludes some or all non-essential components, for example, input/output devices other than those required for network communications.

With reference to FIG. 1, an exemplary system includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures.

The computer 110 typically includes a variety of computer-readable media. Computer-readable media can be any available media that can be accessed by the computer 110 and includes both volatile and nonvolatile media, and removable and nonremovable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, optical disk storage, magnetic cassettes, magnetic tape, magnetic disk storage or other magnetic storage devices, or any other medium which can be used to store the desired information and which can be accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above are included within the scope of computer-readable media.

The system memory 130 includes computer storage media in the form of volatile and/or nonvolatile memory such as read only memory (ROM) 131 and random access memory (RAM) 132. By way of example, and not limitation, FIG. 1 illustrates operating system 134, application programs 135, other program modules 136 and program data 137.

The computer 110 may also include other removable and nonremovable, volatile and nonvolatile computer storage media. By way of example only, FIG. 1 illustrates a hard disk drive 141 that reads from or writes to nonremovable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CDROM. Other computer storage media that can be used in the exemplary operating environment include, but are not limited to, magnetic tape cassettes, flash memory cards, DVDs, digital video tape, solid state RAM, solid state ROM, and the like. The hard disk drive 141 is typically connected to the system bus 121 through a nonremovable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a tablet, or electronic digitizer, 164, a microphone 163, a keyboard 162 and pointing device 161, commonly referred to as a mouse, trackball or touch pad. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 by way of an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 197 and printer 196, which may be connected through an output peripheral interface 194 or the like.

The computer 110 preferably operates or is adaptable to operate in a networked environment using logical connections to one or more remote computers, such as a remote computer 180. The remote computer 180 may be a personal computer, a server, a router, a peer device or other network node, and typically includes some or all of the elements described above relative to the computer 110, although only a memory storage device 181 has been illustrated in FIG. 1. The logical connections depicted in FIG. 1 include a LAN 171 and a WAN 173, but may also include other networks. For example, the computer 110 may comprise the source machine from which data is being migrated, and the remote computer 180 may comprise the destination machine. Note however that source and destination machines need not be initially connected by a network or otherwise, but instead, data may be migrated by way of any media capable of being written by the source platform and read by the destination platform or platforms. For example, one non-limiting instance of such a medium is a portable flash memory medium, sometimes referred to as a memory "key" or memory "stick." Other non-limiting examples will be given below.

When used in a LAN environment, the computer 110 is connectable to the LAN 171 through a network interface or adapter 170. The computer 110 may also include a modem 172 or other means for establishing communications over the WAN 173. The modem 172, which may be internal or external, may be connected to the system bus 121 by way of the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 2:
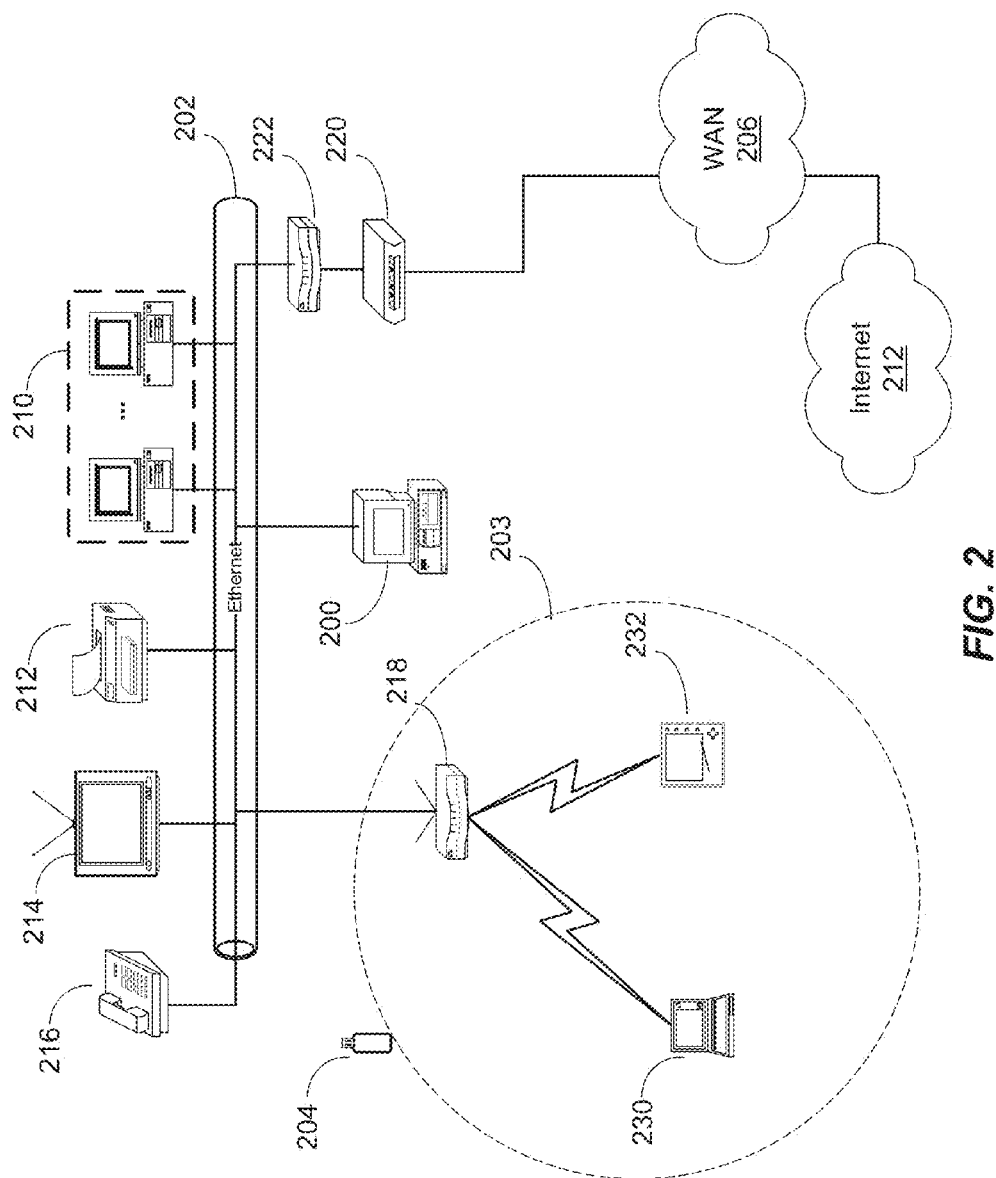
FIG. 2 is a diagram illustrating an arrangement of computing devices for carrying out the configuration of a computer network in accordance with one embodiment.

Turning to FIG. 2, a simple example of a computing environment usable in implementing an embodiment is depicted. In the example shown in FIG. 2, a computer 200 communicates with a LAN 202 by way of a physical connection. Alternatively, the computer 200 communicates with the LAN 202 by way of WAN or other communications media. In an embodiment, the computer 200 is not initially in communications with any other device or network at all. In an embodiment, the computer 200 executes a program that generates network configuration settings. These settings are stored on a portable media device (PM) 204, such as a USB flash drive, Memory Stick, CompactFlash card, SmartMedia card, or other storage device. The computer 200 may directly accept the PM 204 by way of a built-in USB port, but alternatively is connected to a peripheral device, such as a card reader, that accepts the PM 204. In one embodiment, the PM 204 is a Bluetooth device that communicates wirelessly with the computer 200.

Once settings have been generated and stored on the PM, then, by attaching the PM 204 to various networkable devices, the appropriate network configuration settings are transferred to those devices, enabling network communications over a LAN 202, WAN 206, WLAN 208 or other types of computer networks. Exemplary networkable devices accepting the PM 204 include other computers 210 physically connected to the LAN 202. Although the other computers 210 are physically connected to the same LAN 202, they generally cannot communicate with one another until their network settings are appropriately configured. By attaching the PM 204, the appropriate network settings are transferred to the other computers 210, allowing for network communication between them. Similarly, a printer 212 accepting the PM 204 is configured for communications on the LAN 202, and/or on a wireless network 203, making the printer 212 accessible to the computer 200 and other devices on the LAN 202 and/or wireless network 203. A networkable television 214 and networkable telephone 216 also accept the PM 204 and are thereby configured for communications on the LAN 202 and/or wireless network 203.

Other network hardware is likewise configured for network communication by attaching the PM 204. A wireless access point 218 accepts the PM 204 and is thus configured to allow communications between devices on the LAN 202 and other appropriately configured wireless devices. For example, if the computer 200 was equipped with wireless networking hardware, then it could connect to the LAN 202 by communicating wirelessly with the wireless access point 218. A modem 220 and router 222 also accept the PM 204 and are thereby configured to allow communication between devices on the LAN 202 and devices connected to a WAN 206 or the Internet 224. Notably, attaching the PM 204 allows for network configuration on devices such as modems 220 and routers 222 that typically do not contain input and output mechanisms such as keyboards and monitors.

The PM 204 is also used to configure wireless networks. For example, a notebook computer 230 and a tablet computer 232 each accept the PM 204 and are thus appropriately configured for wireless communications over an ad hoc wireless network 234. Other computers 236 accepting the PM 204 are similarly configured to communicate over the ad hoc wireless network 234. In this way, access to the ad hoc network is generally limited to those computers that can physically attach the PM 204. Without the PM 204, a user would have to enter configuration settings—including the network name and any security keys—in order to access the wireless network 234. By attaching the PM 204, a computer is granted access to the wireless network 234 quickly and transparently. The computer networks configured by the PM 204 can be peer-to-peer networks (e.g., unmanaged "workgroups" that do not require a dedicated server) or domain-based networks such as client-server networks.

Figure 3:
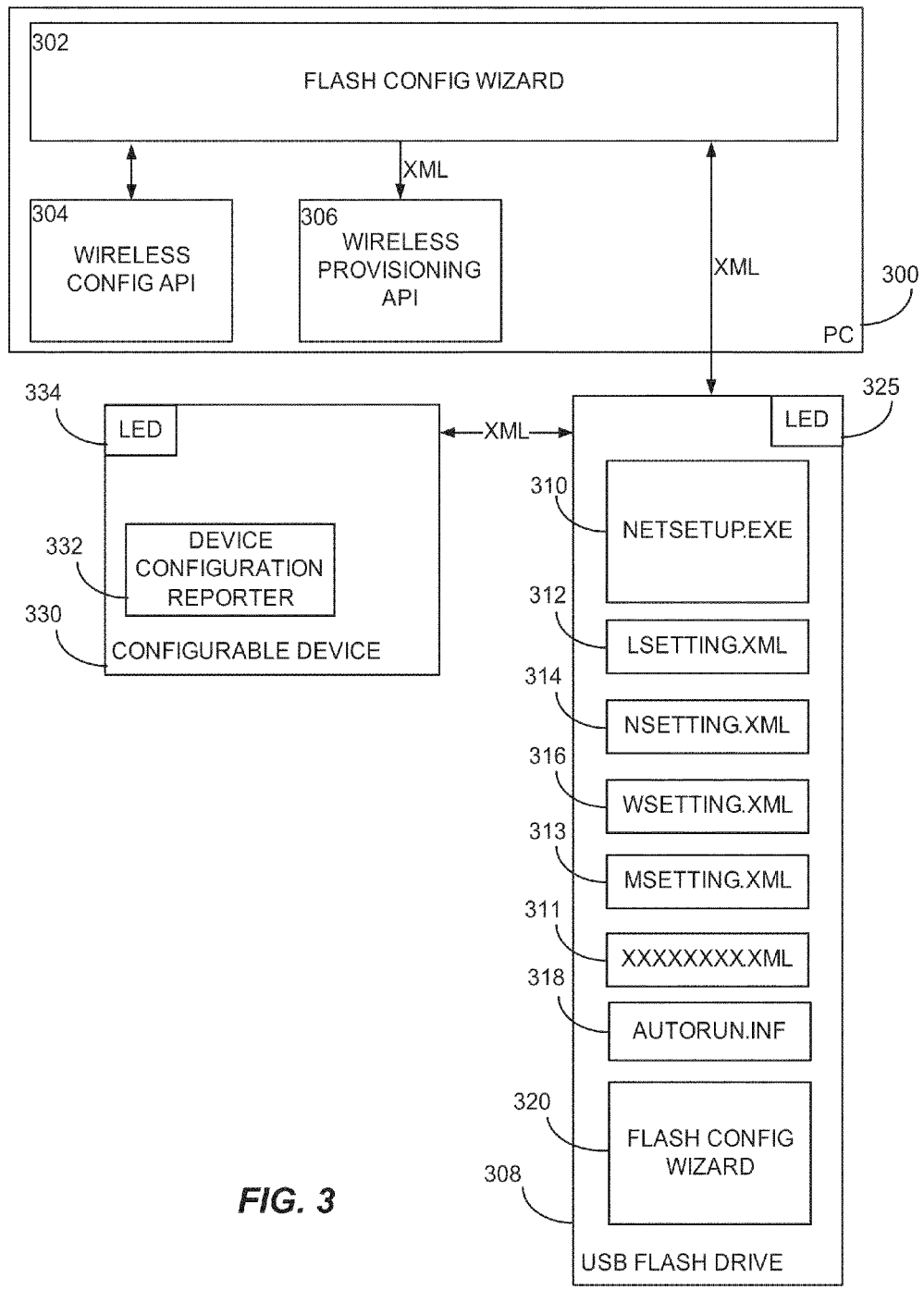
FIG. 3 is a simplified schematic illustrating a software architecture for carrying out the configuration of a computer network in accordance with one embodiment.

Turning attention to FIG. 3, a software architecture for generating and storing network configuration settings is now described, in accordance with an embodiment. A Flash Config Wizard 302 is executed on a computer 300 and communicates with the computer through a wireless configuration application programming interface (API) 304 to generate wireless network configuration settings. In the Windows operating system environment, for example, the WZCDLG.DLL library can be used. In one embodiment, the Flash Config Wizard 302 is a standalone application. In another embodiment, the Flash Config Wizard 302 is integrated into a general network setup application. The Flash Config Wizard 302 outputs XML files to the computer through a wireless provisioning API 306. The Flash Config Wizard 302 further outputs XML files to an attached portable media device, such as a USB flash drive 308. The USB flash drive 308 stores files and applications for use in the network configuration process. An embodiment includes a network setup application 310 stored in the root of the USB Flash Drive 308 in order to facilitate the configuring of network settings on other devices. The network setup application is stored on the USB flash drive 308 by the Flash Config Wizard 302. When the USB flash drive 308 is attached to another device, that device can run the network setup application 310 to load the relevant network settings from the USB flash drive 308 to the other device.

In an embodiment, the USB flash drive 308 further stores an autorun file 318. When the USB flash drive 308 is attached to a compatible device that recognizes the autorun file, the detection of the autorun file 318 automatically triggers the device to execute the network setup program 310. In this way, no user intervention is required to transfer the network settings to the device after the USB flash drive 308 has been attached.

The USB flash drive 308 also stores, in one embodiment, a Flash Config Wizard copy 320. When the USB flash drive 308 is attached to another computer, the Flash Config Wizard 320 is executed by the computer to allow for manual guidance in transferring and modifying the network configuration settings.

Also stored on the USB flash drive 308 are several XML files representing the generated network configuration settings. These files are stored in a folder named SMRTNKEY on the USB flash drive 308. An LSETTING.XML file 312 contains settings for a LAN. An NSETTING.XML file 314 contains settings for a WAN. A WSETTING.XML file 316 contains settings for a wireless LAN. An MSETTINGS.XML file 313 contains settings for a broadband modem. These XML files are described in greater detail below. By storing these network configuration settings, a single USB flash drive 308 can be used to configure a variety of devices (such as personal computers, routers, printers, PDAs, and WAPs) to communicate over a variety of types of networks. In another embodiment, the network configuration files are in binary format instead of XML. The binaries are stored on the USB flash drive, either alone or with the XML files, allowing devices without XML parsers to read the network configuration settings.

After the network settings configuration files have been transferred to the USB flash drive 308, the USB flash drive 308 is installed in a configurable device 330. Configurable device 330 must provide support for USB Host Port, USB Mass Storage Devices, file allocation table (FAT) 16/32 file systems, and must include an XML Parser. Additionally access points must support 104 bit wireless encryption protocol (WEP), Infrastructure mode, and IEEE 802.11b protocol. In an embodiment, configurable device 330 includes a light emitting diode (LED) 334 that blinks three times after the network configuration files are downloaded from the USB flash drive 308. In another embodiment, the USB flash drive 308 includes an LED 325 the blinks three times after the files have been downloaded to the device 330.

In an embodiment, the USB flash drive 308 is also used to store a device configuration file 311 for describing the configuration of a device to which the USB flash drive 308 has been attached. Configurable device 330 further includes a device configuration reporter 332 for generating the device configuration file 311. Each device that is configured using the USB flash drive 308 generates an XML file describing the configuration of that device, and reports any fault conditions. The device then writes the device configuration file 311 to the USB flash drive 308, which is next attached to a PC that uploads the device configuration file 311. The PC uses the device configuration file, for example, in a diagnostic tool to determine why network configuration failed. In another example, the PC obtains a uniform resource locator (URL) of the device manufacturer from the device configuration file 311, and uses the URL to download, through hyper text transfer protocol over secure socket layers (HHTPS), an encryption key to access the device. The device configuration file 311 is stored in the SMRTNKY folder in a subfolder having the same name as the device. The device configuration file 311, described in greater detail below, is named using the last eight bytes of the media access control (MAC) address of the device.

Figure 4:
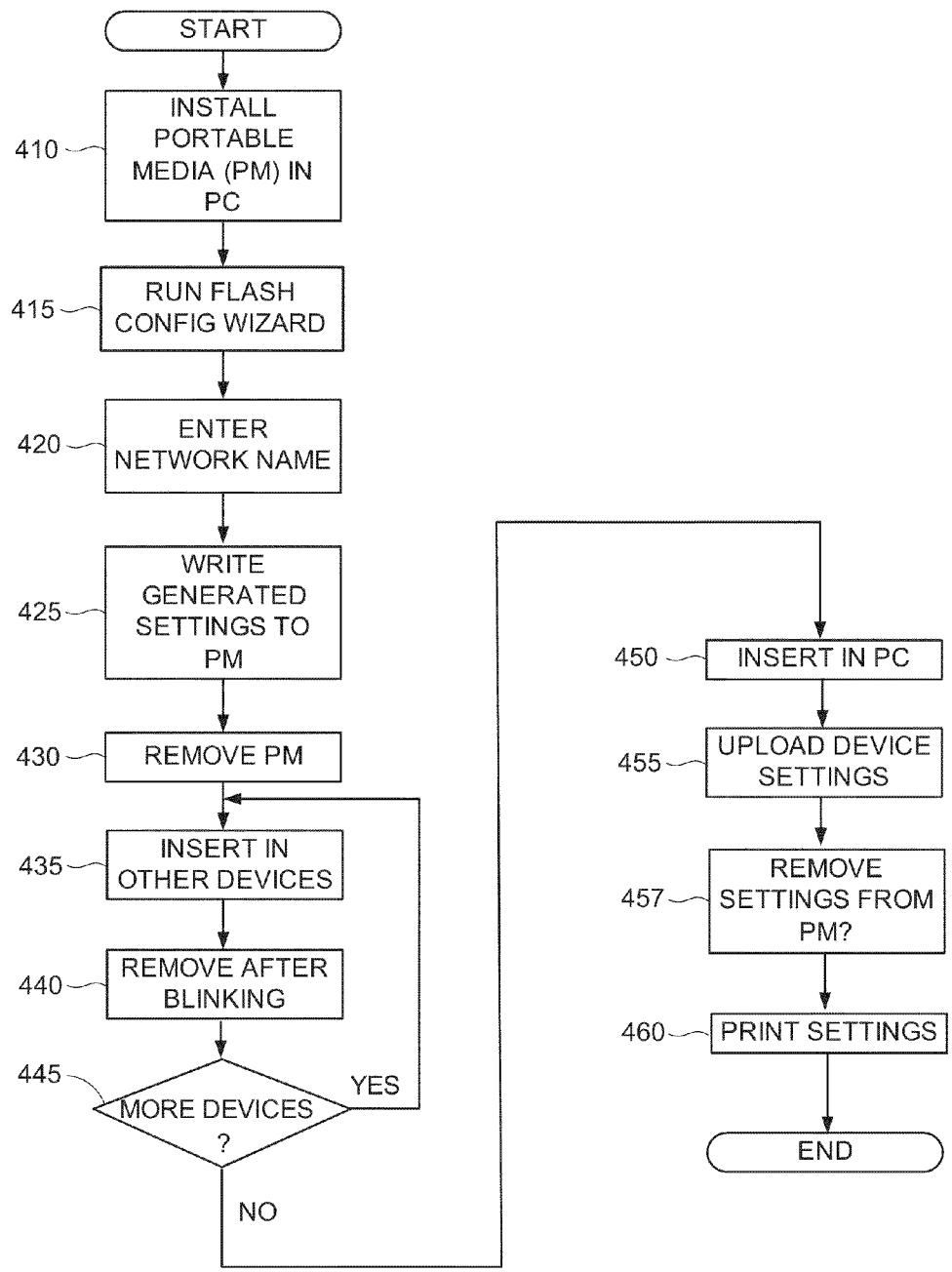
FIG. 4 is a flow diagram illustrating a method of generating network settings and storing the settings to a portable media device in accordance with one embodiment.

A method for using a portable media device to generate and store network configuration settings, in accordance with an embodiment, is now described with reference to FIG. 4. A user installs a portable media device into a computer at step 410. An interactive configuration tool, or "Flash Config Wizard", is then executed on the computer at step 415. The Flash Config Wizard interacts with the user to generate a set of network settings at step 420. These network settings include configuration data necessary for configuring the computer for use with a wireless network, LAN, WAN, or broadband modem. The settings are written to the portable media device at step 425, and the user removes the portable media device at step 430. At step 435, the user installs the portable media device in a device that the user wishes to configure. The user removes the portable media device after successful configuration, as indicated by a blinking LED, at step 440. At step 445, if there are more devices to be configured, the user repeats steps 435 and 440 for those devices. The user reinstalls the portable media device in the computer executing the Flash Config Wizard at step 450. The Flash Config Wizard uploads the device configuration(s) at step 455. In an embodiment, the Flash Config Wizard uses the device configuration(s) to perform a diagnostic assessment of any errors or faults that occurred in configuring the devices. At step 460, the user prints a hard copy of the various network settings. By printing a hard copy, the user can more easily configure those network devices that do not accept the personal media device and therefore may need to be configured manually.

Figure 5A:
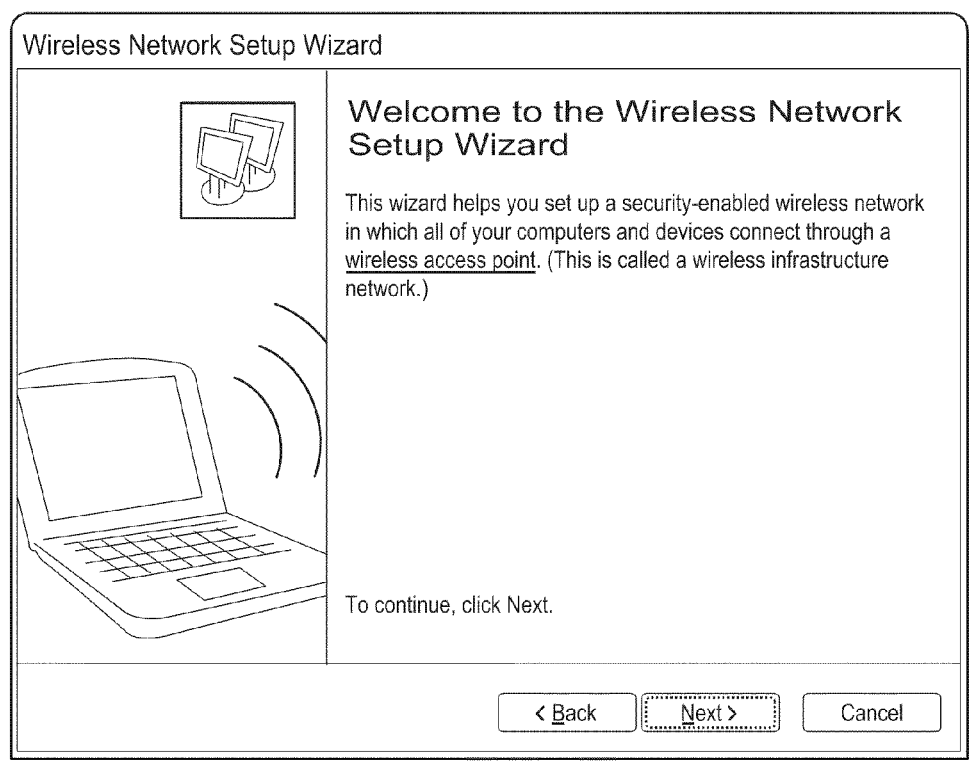
FIGS. 5A-J are screenshots of a wizard application for generating network settings and storing the settings to a portable media device in accordance with one embodiment.
Figure 5B:
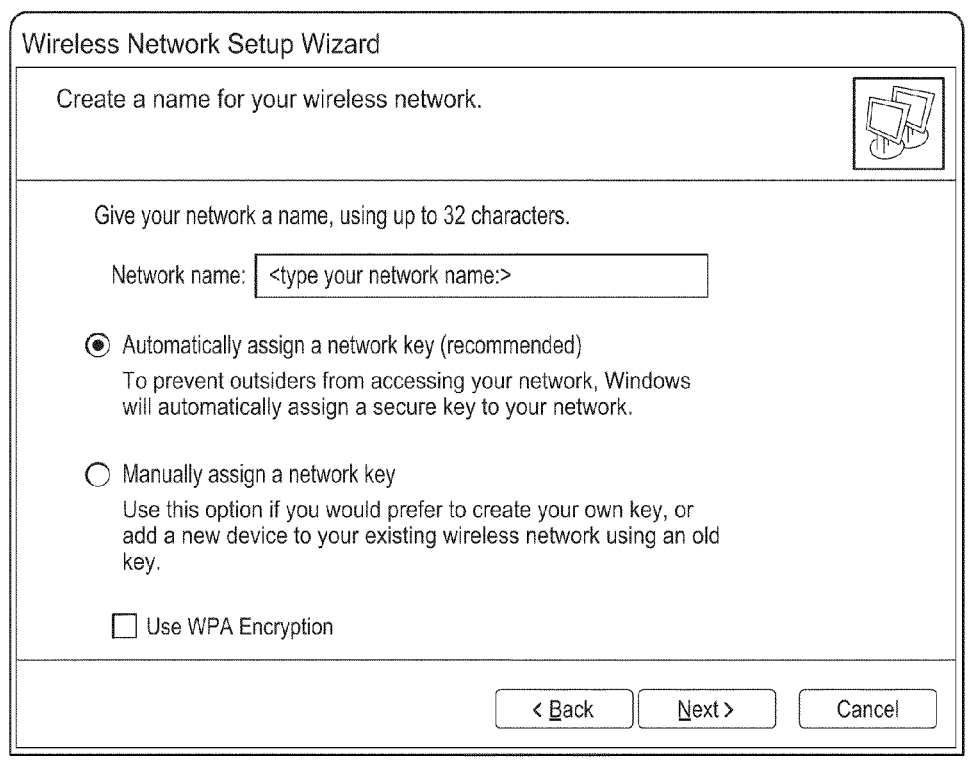
Figure 5C:
Figure 5D:
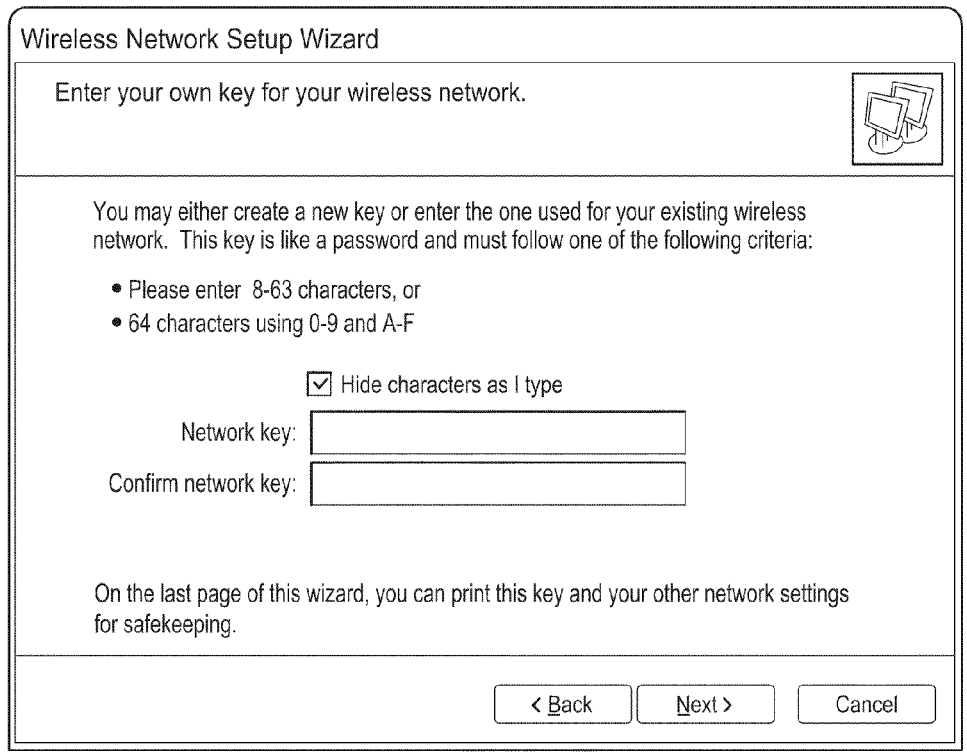
Figure 5E:
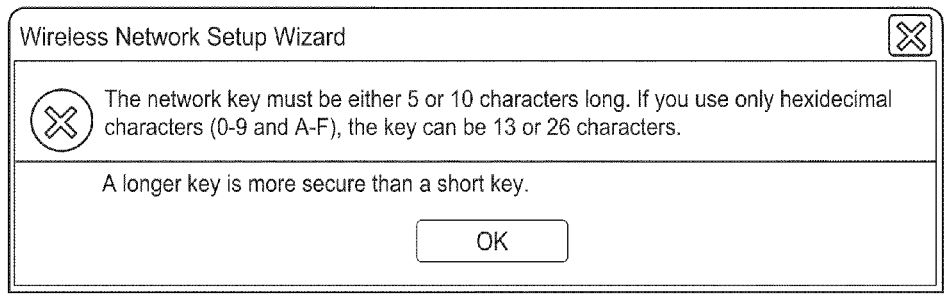

The Flash Config Wizard, as used in an embodiment, is now described in greater detail with respect to the screenshots shown in FIGS. 5A-5J. Although the figures illustrate a program for setting up a wireless network, a Flash Config Wizard is not limited to configuring wireless networks; other networks such as wired LANs can similarly be configured using the Flash Config Wizard, in an embodiment. After an introductory screen shown in FIG. 5A, the user is prompted for a network name and is presented the option of manually or automatically generating a network key in FIG. 5B. In the screen shown in FIG. 5C, the user is prompted for a 5 or 10 character ASCn network key, or a 13 or 16 character hexadecimal network key. If the user selected Wi-Fi Protected Access (WPA) encryption in the previous screen, the user is prompted for a 8-63 character ASCII network key, or a 64 character hexadecimal network key, in the screen shown in FIG. 5D. FIG. 5E shows an error screen that appears if the user enters an invalid key.

Figure 5F:
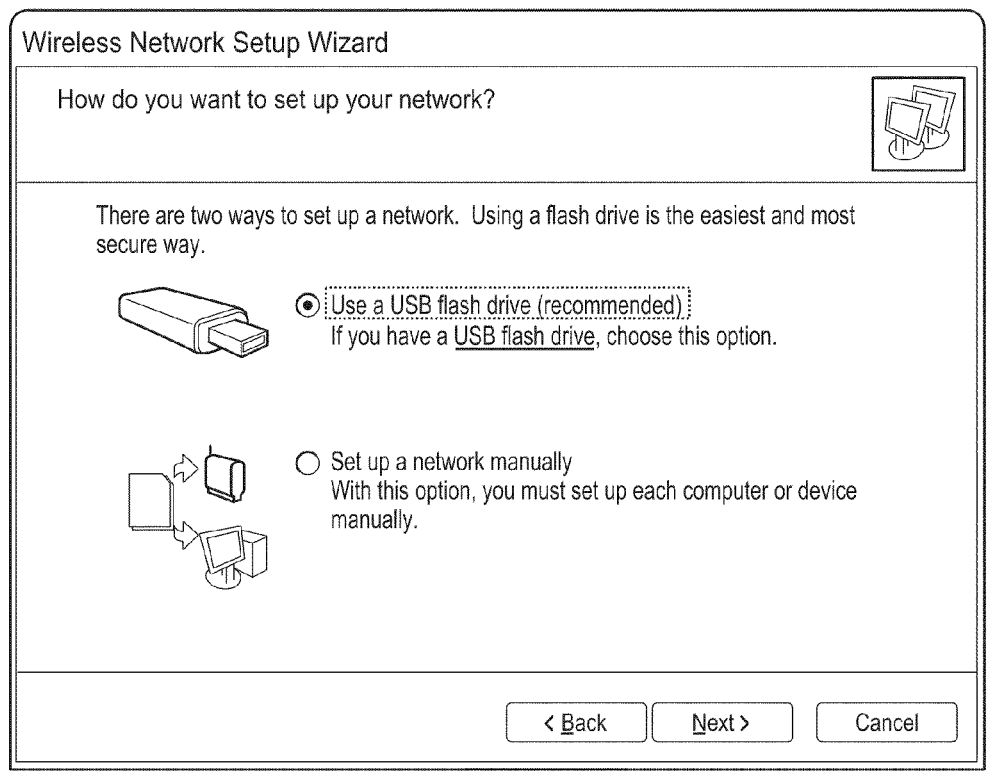
Figure 5G:
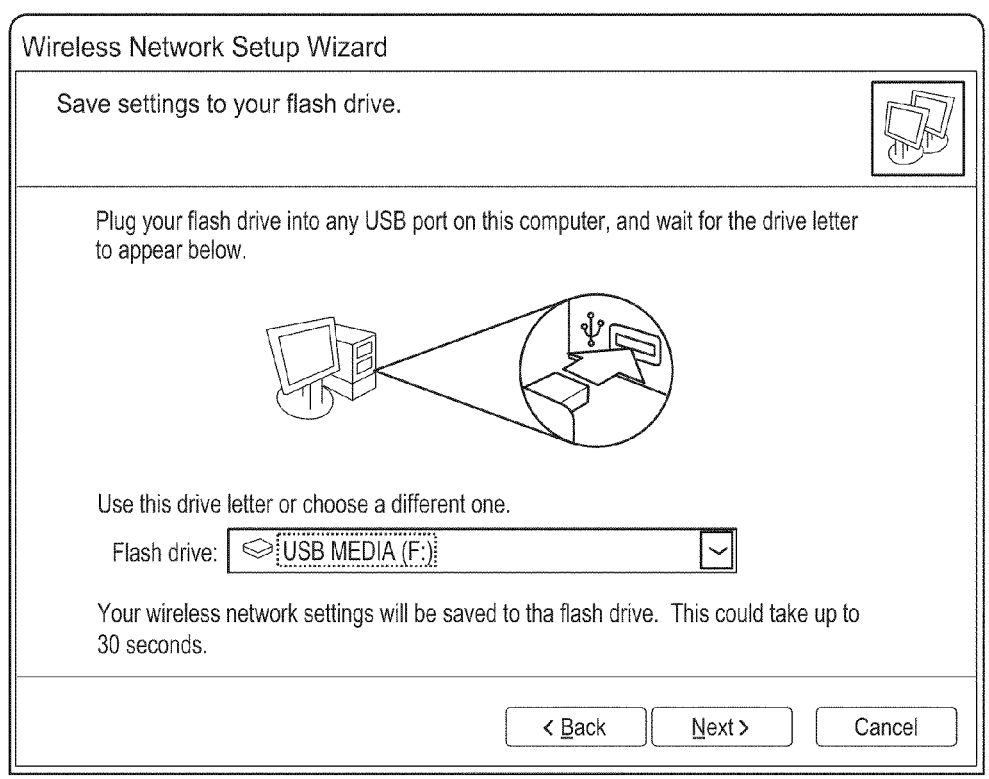
Figure 5H:
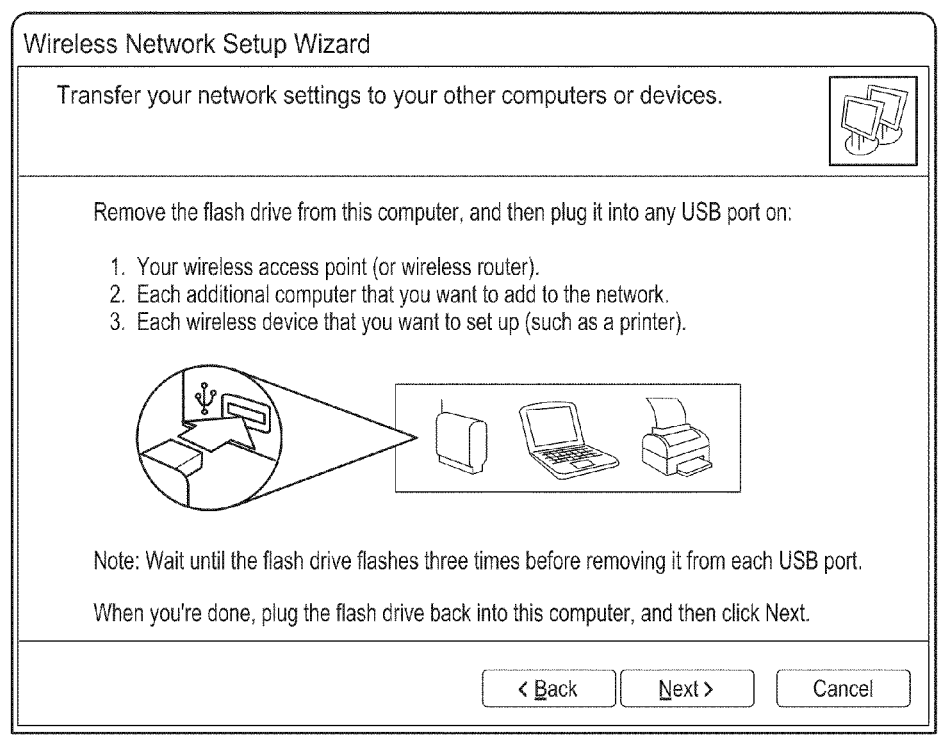
Figure 5I:
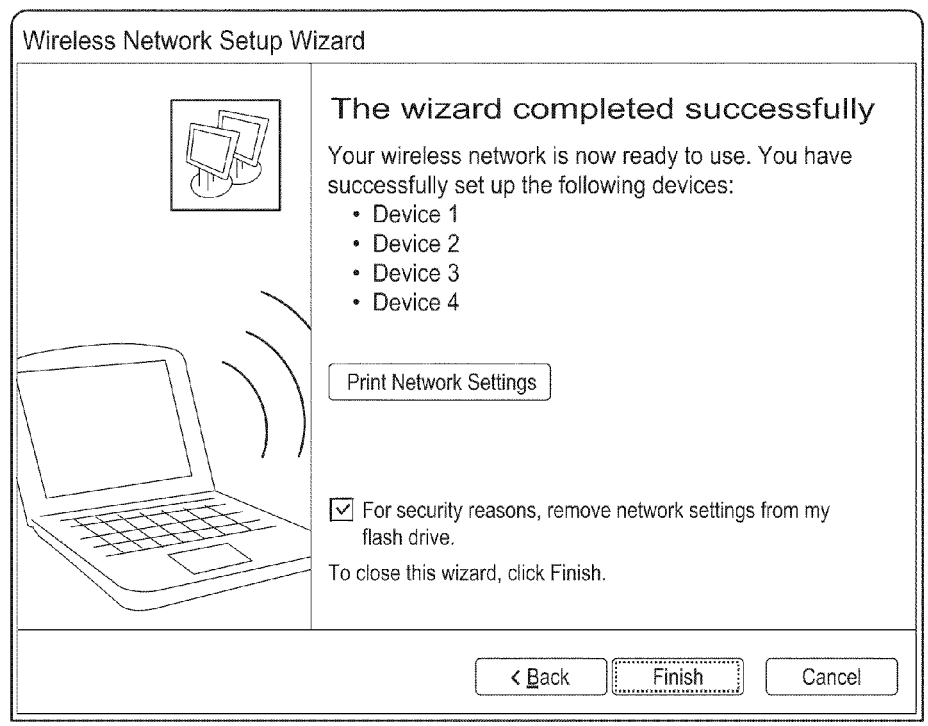
Figure 5J:
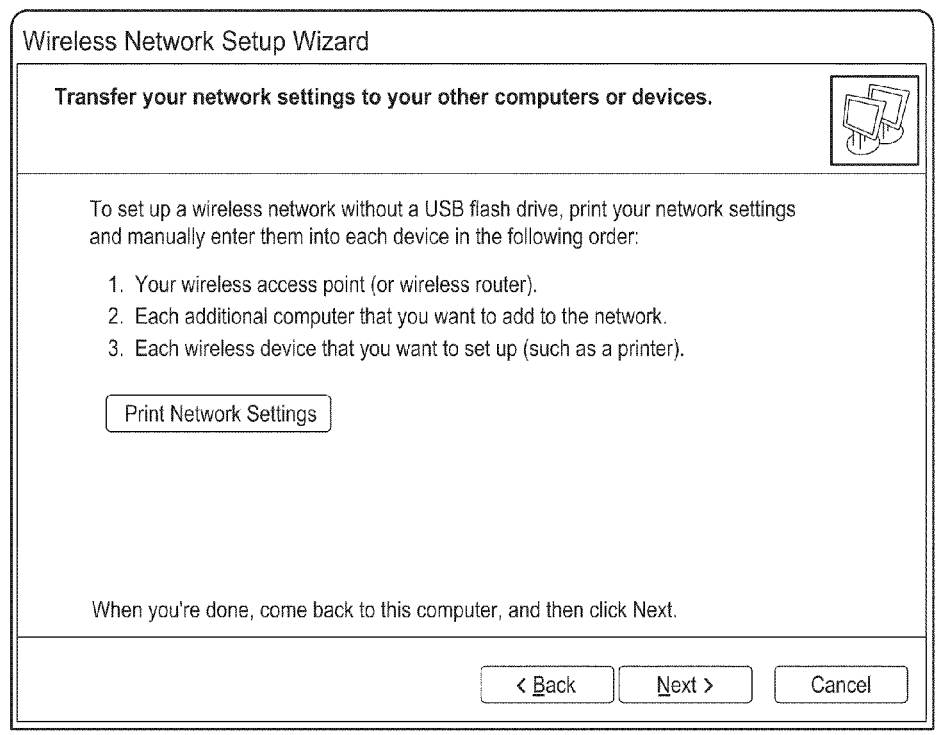

In the screen shown in FIG. 5F, the user is prompted to save the settings to a USB flash drive, or set up each device manually. In the screen shown in FIG. 5G, the Wizard prompts the user to insert and identify a USB flash drive. When the user clicks "Next" on this screen, the Wizard stores the generated network settings to the portable media device. When the network settings have been completely stored on the portable media device, the user is presented with another screen shown in FIG. 5H, prompting the user to remove the portable media device and plug it into all additional computers, printers, or other network devices that are to be in communication over the network. After the user is finished configuring additional devices, the user plugs the portable media device back into the computer and is presented with the screen in FIG. 5I notifying the user of successful configuration. The Wizard also presents the user with a "Print" button, allowing the user to print a hard copy of the network settings, which allows the user to manually configure those network devices that do not accept the portable media device or that cannot be automatically configured for the network. FIG. 5J depicts the screen shot presented to the user if the user elects to configure devices manually. The user is prompted to print the settings for manual configuration.

Figure 6:
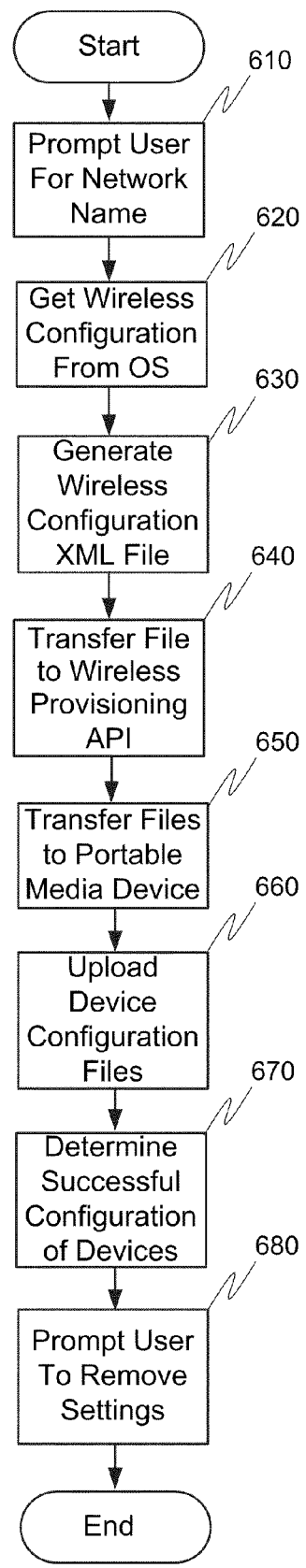
FIG. 6 is a flow diagram illustrating a method of generating wireless network settings and storing the network settings on a portable media device.

The operation of the Flash Config Wizard is now described with reference to FIGS. 6-9. FIG. 6 illustrates the operation of the Flash Config Wizard with respect to generating a wireless configuration. At step 610, the Flash Config Wizard prompts the user for a network name. The Flash Config Wizard then gets the wireless configuration settings through a wireless configuration API at step 620. The wireless configuration API is provided by the OS, such as WZCDLG.DLL in the Microsoft Windows® OS. In an alternative embodiment, the user manually enters the wireless configuration settings. At step 630, the Flash Config Wizard generates an XML file containing the wireless configuration settings in accordance with a schema. The Flash Config Wizard transfers the XML file to a wireless provisioning API in the OS so that the host computer may be configured with the wireless settings at step 640. The Flash Config Wizard also transfers the XML file, along with an autorun file, a network setup application, and a copy of the Flash Config Wizard, to a portable media device at step 650. After the user has configured the wireless devices and re-installed the portable media device in the host computer, the Flash Config Wizard uploads device configuration files from the portable media device at step 660. At step 670, the Flash Config Wizard analyzes the device configuration files to determine whether the wireless devices were successfully configured.

Figure 7:
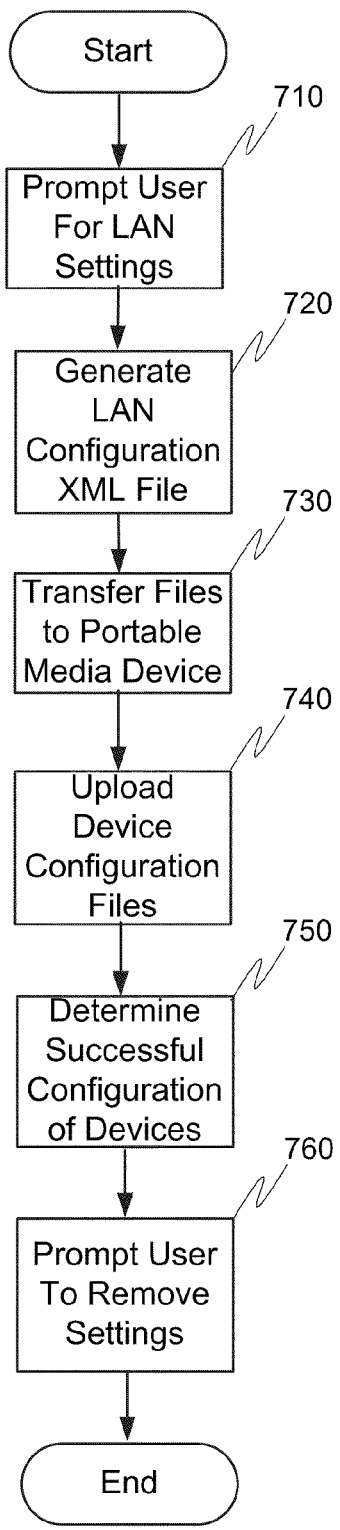
FIG. 7 is a flow diagram illustrating a method of generating local area network settings and storing the network settings on a portable media device.

FIG. 7 illustrates the operation of the Flash Config Wizard with respect to generating a LAN configuration. The Flash Config Wizard prompts the user to enter various LAN settings at step 710. These settings include, for example, the workgroup name and IP settings. The settings are described in more detail below. In an alternative embodiment, the Flash Config Wizard acquires the LAN settings through an API provided by the OS. At step 720, the Flash Config Wizard generates an XML file containing the LAN configuration settings in accordance with a schema. The Flash Config Wizard transfers the XML file, along with an autorun file, a network setup application, and a copy of the Flash Config Wizard, to a portable media device at step 730. After the user has configured the LAN devices and re-installed the portable media device in the host computer, the Flash Config Wizard uploads device configuration files from the portable media device at step 740. At step 750, the Flash Config Wizard analyzes the device configuration files to determine whether the LAN devices were successfully configured.

Figure 8:
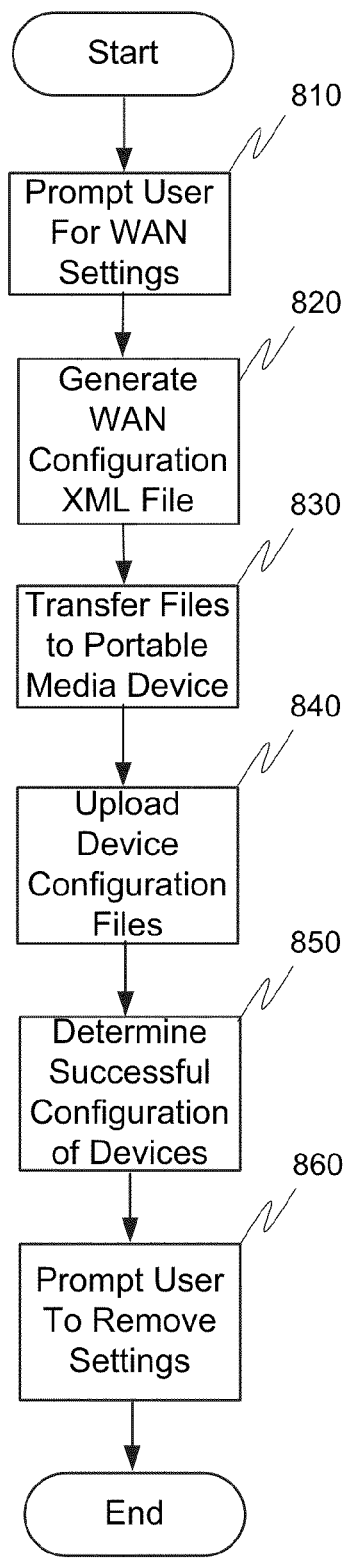
FIG. 8 is a flow diagram illustrating a method of generating wide area network settings and storing the network settings on a portable media device.

FIG. 8 illustrates the operation of the Flash Config Wizard with respect to generating a WAN configuration. The Flash Config Wizard prompts the user to enter various WAN settings at step 810. These settings include, for example, the type of WAN and a domain name service (DNS) address. The settings are described in more detail below. In an alternative embodiment, the Flash Config Wizard acquires the WAN settings through an API provided by the OS. At step 820, the Flash Config Wizard generates an XML file containing the WAN configuration settings in accordance with a schema. The Flash Config Wizard transfers the XML file, along with an autorun file, a network setup application, and a copy of the Flash Config Wizard, to a portable media device at step 830. After the user has configured the WAN devices and re-installed the portable media device in the host computer, the Flash Config Wizard uploads device configuration files from the portable media device at step 840. At step 850, the Flash Config Wizard analyzes the device configuration files to determine whether the WAN devices were successfully configured.

Figure 9:
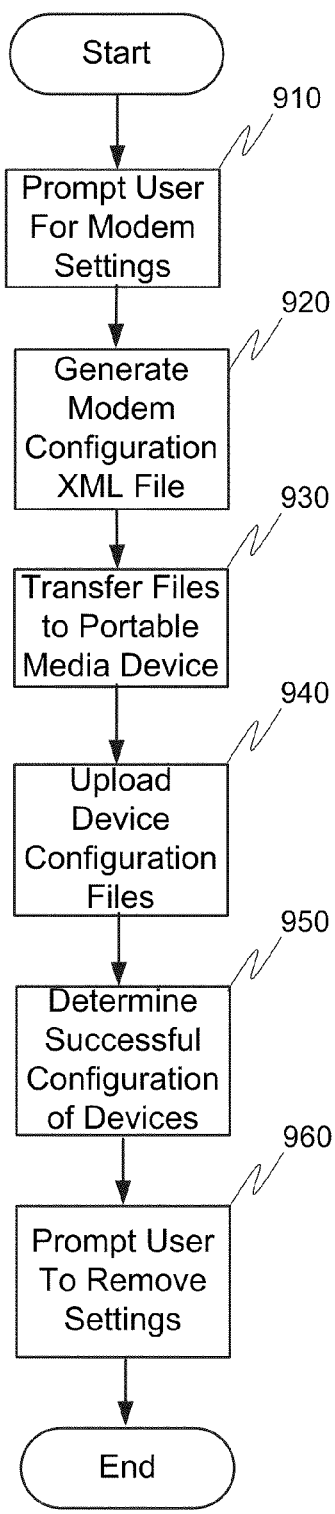
FIG. 9 is a flow diagram illustrating a method of generating broadband modem settings and storing the network settings on a portable media device.

FIG. 9 illustrates the operation of the Flash Config Wizard with respect to generating a broadband modem configuration. The Flash Config Wizard prompts the user to enter various broadband modem settings at step 910. These settings are provided by the user's Internet service provider (ISP) and include, for example, a username and password for broadband Internet access. The settings are described in more detail below. In an alternative embodiment, the Flash Config Wizard acquires the LAN settings through an API provided by the OS. At step 920, the Flash Config Wizard generates an XML file containing the broadband modem configuration settings in accordance with a schema. The Flash Config Wizard transfers the XML file, along with an autorun file, a network setup application, and a copy of the Flash Config Wizard, to a portable media device at step 930. After the user has configured the devices for use with the broadband modem and re-installed the portable media device in the host computer, the Flash Config Wizard uploads device configuration files from the portable media device at step 940. At step 950, the Flash Config Wizard analyzes the device configuration files to determine whether the devices were successfully configured.

The procedures described with reference to FIGS. 6-9 are combined in the Flash Config Wizard when the user wishes to configure multiple types of network settings (e.g. wireless and WAN settings). In this manner, the configuration files are written to the portable media device simultaneously.

Figure 10:
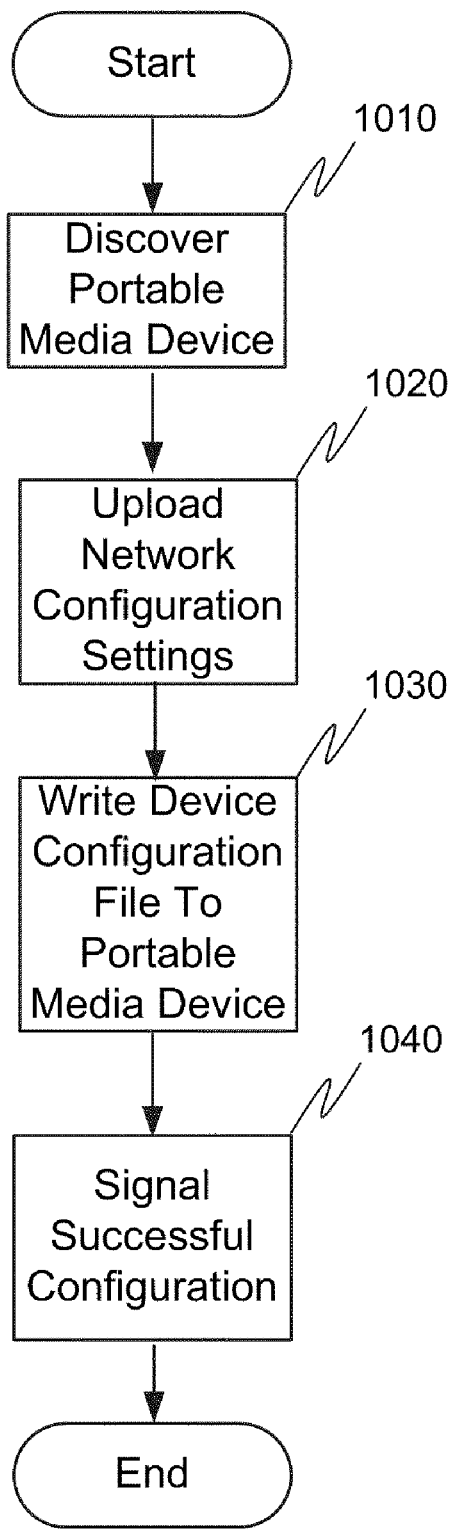
FIG. 10 is a flow diagram illustrating a method uploading network settings from a portable media device.

FIG. 10 illustrates the operation of an exemplary device that is configured using a portable media device. At step 1010, a device detects a portable media device containing network configuration files in a device to be configured. The device uploads the relevant network configuration settings from the portable media device and is provisioned at step 1020. If the device supports an automatic discovery protocol, such as UPnP, a computer on the network will immediately recognize the new device and be notified of its availability. In one embodiment, the uploading is performed automatically, without any user intervention. The device searches the stored XML files for the particular data fields it requires, and uploads the corresponding data from the portable media device. In this way, the device only reads data relevant to its operation. At step 1030, the device generates a device configuration file and transfers the file to the portable media device. The device configuration file includes, for example, the manufacturer and model of the devices, as well as network configuration settings. The device configuration file is explained in more detail below.

A personal computer generates the network settings and device configuration files according to corresponding XML schemas. In one embodiment, a personal computer generates network settings and device configuration files for multiple profiles. The files corresponding to each profile a stored in different profile folders on the portable media device. In this manner, a user may maintain configurations for both a home and an office network on the same portable media device.

In another embodiment, the network settings files include a time-to-live (TTL) setting, and devices configured using the portable media device are denied access to the network after the prescribed TTL has passed. In this way a device is granted only temporary access to the network. In another embodiment, the TTL field is used in conjunction with an authentication scheme, such as a thumbprint. In this way, authenticated devices are granted permanent access to the network while guests are granted only temporary access as determined by the TTL field.

Figure 11:
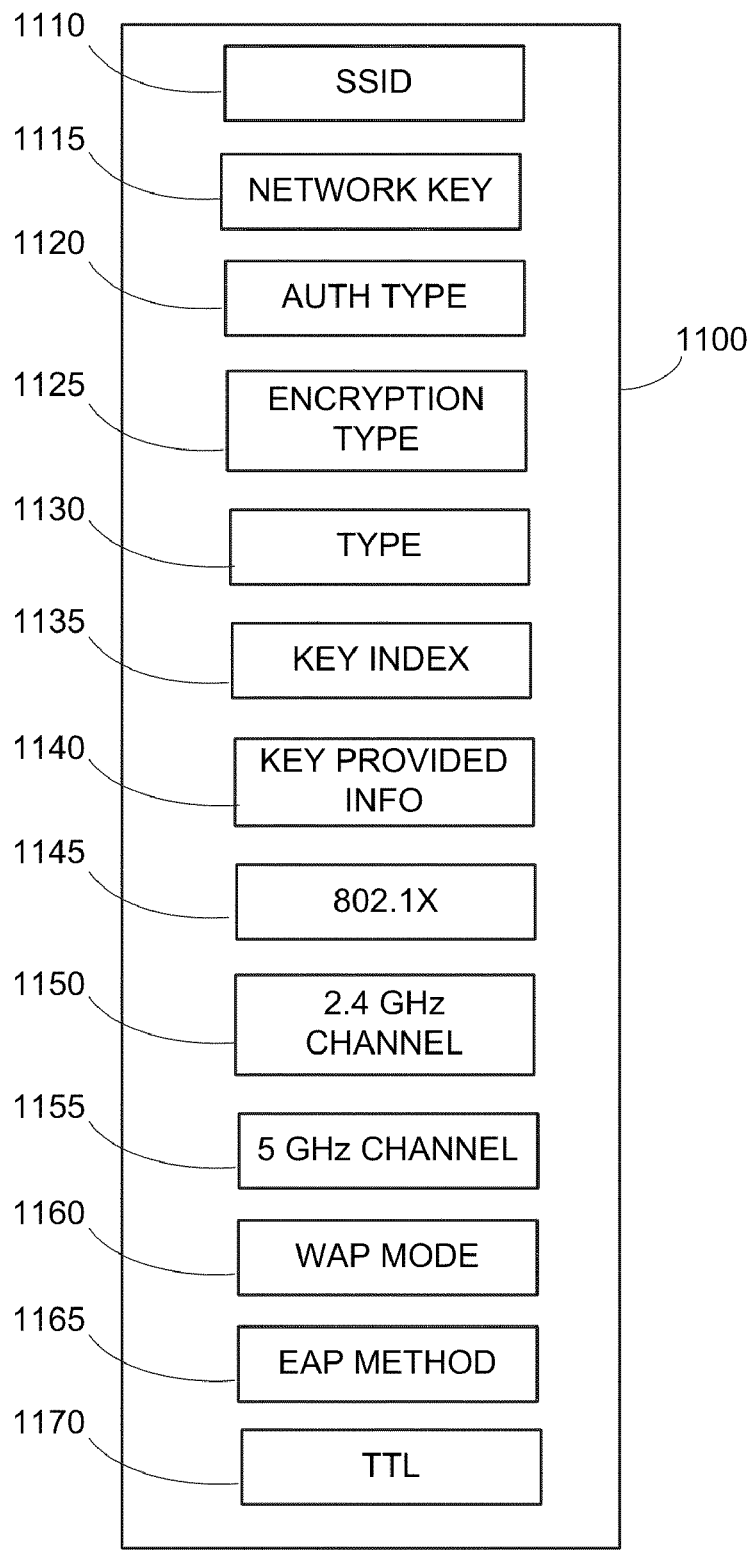
FIG. 11 is a data structure diagram representing wireless network configuration settings in accordance with one embodiment.

FIG. 11 illustrates a conceptualization of the wireless network settings file 1100. Each element of file 1100 represents a wireless configuration setting. Service set identifier (SSID) 1110 is a 1-32 byte string representing the name of the wireless network. SSID 1110 can only occur once. Network Key 1115 is a string that the PC will automatically generate, or alternatively, receive from the PC user. The Network Key 1115 is used for encryption on the wireless network. Authentication Type 1120 indicates the authentication protocol used by the wireless network. Authentication Type 1120 allows a range of possible values, including open, shared, WiFi Protected Access (WPA), WPA Pre-Shared Key (PSK), WPA-none, WPA2, or WPA2 PSK. Encryption Type 1125 indicates the encryption protocol used by the wireless network. Encryption Type 1125 allows a range of possible values, including none, Wireless Encryption Protocol (WEP), Temporal Key Integrity Protocol (TKIP), and Advanced Encryption Standard (AES).

Type 1130 indicates a connection type, and may have as its value either extended service set (ESS) in the case of an ad hoc network, or infrastructure basic service set (IBSS) in the case of an infrastructure network. Key Index 1135 indicates the location of the specific key used to encrypt messages, and may have a value of 1, 2, 3, or 4. Key Index 1135 is used with WEP. Key Provided Info 1140 indicates whether a key is provided automatically, and can have a value of either 0 or 1. 802.1X 1145 indicates whether IEEE 802.1X protocol is used on the network, and can have a value of either 0 or 1. 2.4 GHz Channel 1150 indicates which 2.4 GHz Channel, if any, is being used by the wireless network, and can have a value in the range of 1 to 14. 5 GHz Channel 1155 indicates which 5 GHz channel, if any, is being used by the wireless network, and can have a value of 36, 40, 44, 48, 52, 56, 60, 64, 149, 153, 157, or 161 WAP Mode 1160 indicates the mode in which the wireless access point is operating. WAP Mode 1160 can have a value of infrastructure, bridge, repeater, or station.

EAP Method 1165 indicates the Extensible Authentication Protocol used, and may have a value of EAP-TLS, PEAP-EAP-MSCHAPv2, or PEAP-EAP-TLS. This setting is used for 802.1x authentication only. TTL 1170 indicates a time-to-live element for specifying the length of time a network key is valid.

Figure 12:
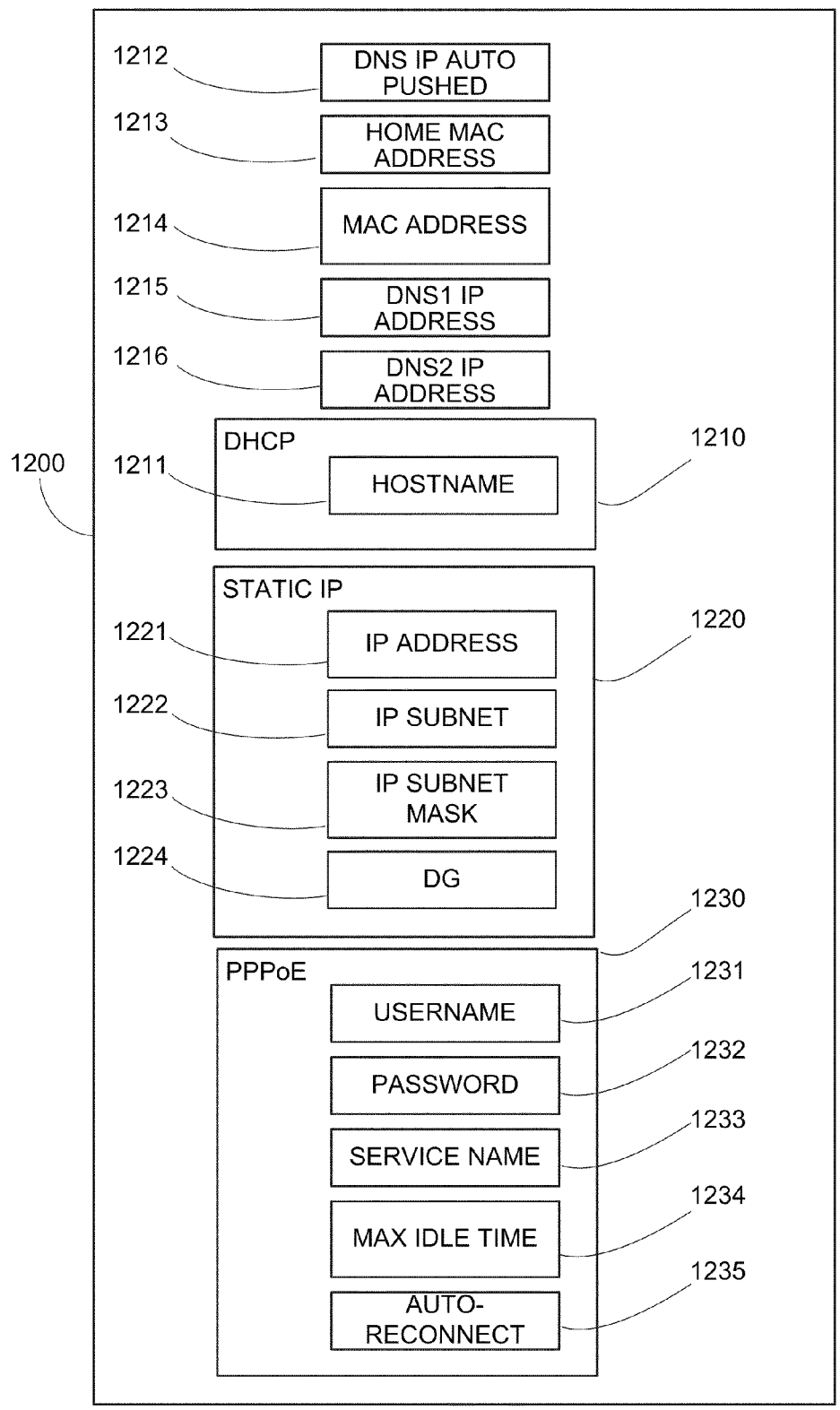
FIG. 12 is a data structure diagram representing LAN configuration settings in accordance with one embodiment.

FIG. 12 illustrates a conceptualization of a WAN network settings file for WAN configurations. The WAN network settings file 1200 includes the following elements: DNS IP Auto Pushed 1212, Clone MAC Address 1213, MAC Address 1214, DNS1 IP Address 1215, DNS2 IP Address 1216, connectionType 1217, wanConnection 1218, DHCP 1210, Static IP 1220, and PPPoE 1230. DNS IP Auto Pushed 1212 indicates whether a domain name service IP address is automatically pushed to the DHCP client. Clone MAC Address 1213 indicates whether the MAC address of the client should be cloned for use in the WAN, and takes a value of 0 or 1. MAC Address 1214 defines the MAC address of the client. DNS1 IP Address 1215 and DNS2 IP Address 1216 define IP addresses for domain name servers. The connectionType element 1217 specifies whether the connection is via Point-to-Point Protocol over Ethernet (PPPoE) or IP. The PPPoE element 1230 further includes subelements Username 1231, Password 1232, Service Name 1233, Max Idle Time 1234, and Auto-Reconnect 1235. Username 1231 defines a username for a device to be configured, and Password 1232 defines a password for a device to be configured. Service Name 1232 defines a string indicating the name of a PPPoE server. Max Idle Time 1234 defines a maximum idle time for the device to be configured. Auto-Reconnect 1235 indicates whether the device to be configured should automatically reconnect to the network, and takes a value of 0 or 1.

The wanConnection 1218 element specifies whether the WAN connection is a DHCP connection or a static IP connection. DHCP element 1210 further includes subelement Hostname 1211. Hostname 1211 defines a string signifying the name of the DHCP host. Static IP element 1220 further includes subelements IP Address 1221, IP Subnet 1222, IP Subnet Mask 1223, DG 1224, DNS1 IP Address 1225, and DNS2 IP Address 1226. IP Address 1221 defines the static IP address of the device to be configured. IP Subnet 1222 defines the IP subnet of the device to be configured. IP Subnet Mask 1223 defines the IP subnet mask of the device to be configured. DG 1224 defines the default gateway for the device to be configured.

Figure 13:
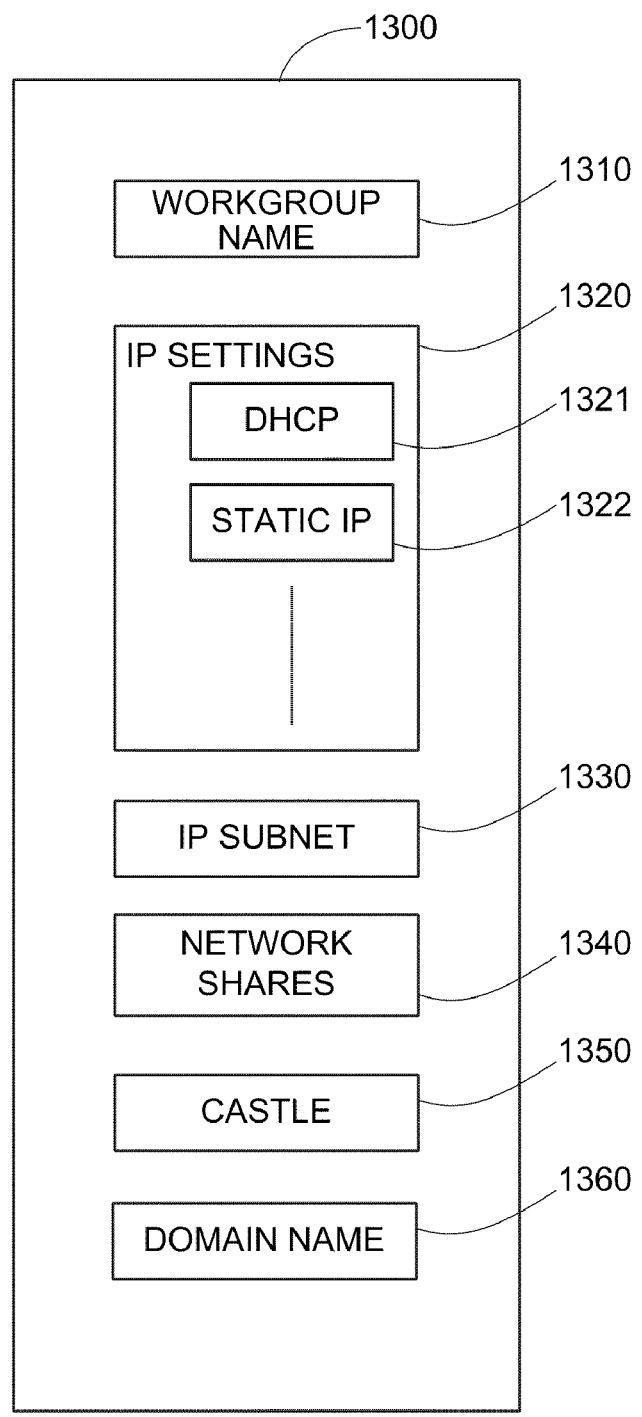
FIG. 13 is a data structure diagram representing WAN configuration settings in accordance with one embodiment.

FIG. 13 illustrates a conceptualization of the LAN settings configuration file for LAN configuration. File 1300 includes the following elements: Workgroup Name 1310, IP Settings 1320, IP Subnet 1330, Network Shares 1340, Castle 1350, and Domain Name 1360. Workgroup Name 1310 defines a workgroup name for the LAN. IP Settings 1320 defines the IP settings for the LAN device. The IP Settings 1320 may include sub elements DHCP 1321 for defining DHCP settings and Static IP 1322 for defining settings using static IP addressing. IP Subnet 1330 defines an IP subnet for the device to be configured, wherein the IP subnet defined by IP Subnet 1330 may be different from the IP subnet defines in IP Settings 1320. Network Shares 1340 defines the file sharing configuration for the LAN which the device to be configured is to join, including network drive mappings. Castle 1350 is a boolean element for indicating whether Castle-type service is enabled. Domain Name 1360 is a string for indicating the domain name for the LAN.

Figure 14:
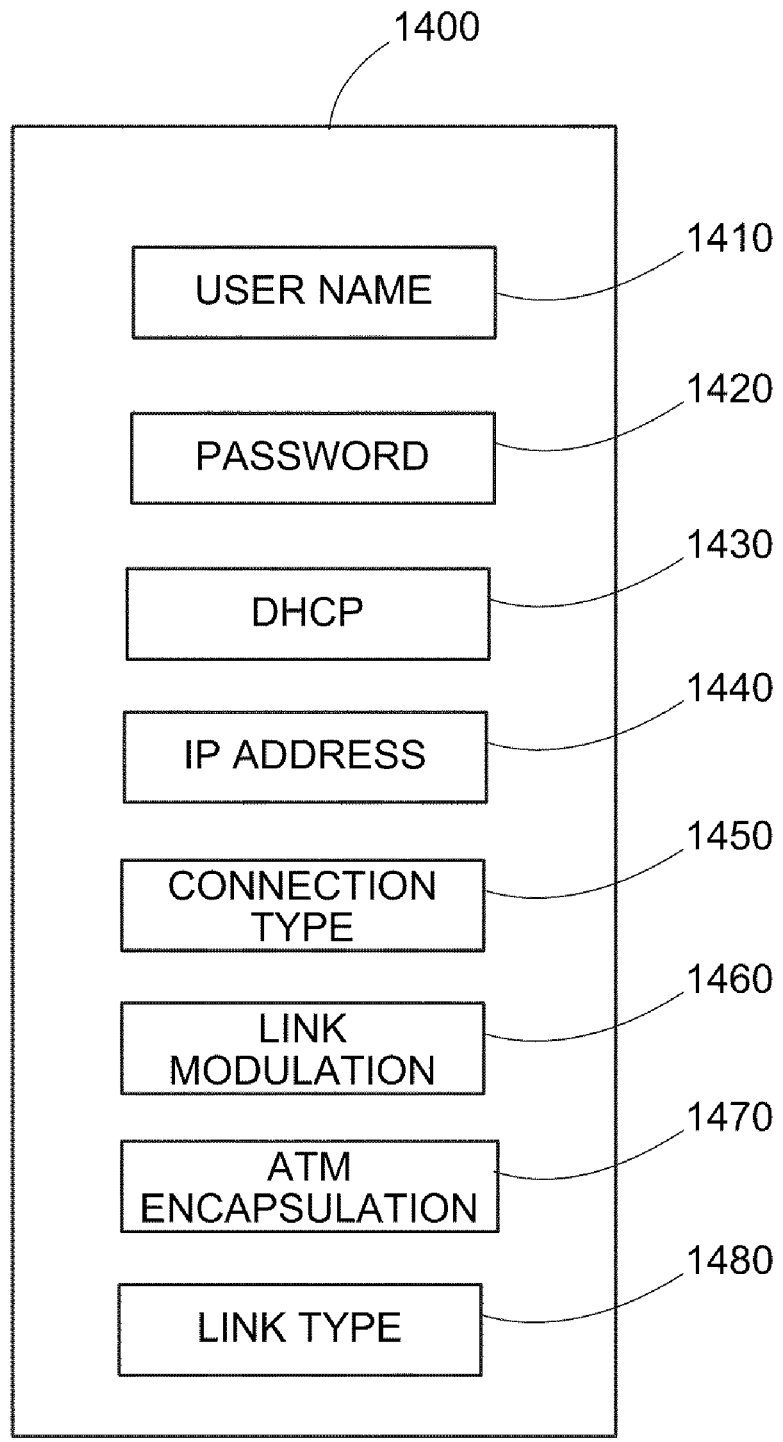
FIG. 14 is a data structure diagram representing broadband modem settings in accordance with one embodiment.

FIG. 14 illustrates a conceptualization of the broadband modem settings configuration file for broadband modem configuration. The file 1400 includes the following elements: User Name 1410, Password 1420, DHCP 1430, IP Address 1440, Connection Type 1450, Link Modulation 1460, ATM Encapsulation 1470, and Link Type 1480. User Name 1410 and Password 1420 indicate a user name and password for accessing the Internet through a broadband ISP. DHCP 1430 is a boolean element that indicates whether DHCP is used. IP Address 1440 indicates the IP address assigned to the modem. Connection Type 1450 indicates the type of connection, and may have as a value PPP, PPPoE, PPPoA, IPoA, EoA, Dial PPP, and CIP. Link Modulation 1460 indicate the modulation type, and may have as a value VDSL, SDSL, ADSLdmt, ADSLlite, IDSL, HDSL, QPSK, 16QAM, 64QAM, 256QAM, Ethernet, Other, or POTS. ATM Encapsulation 1470 indicates whether ATM encapsulation is LLC or VCMUX. Link Type 1480 indicates whether the link is via DSL, Cable, Ethernet, or POTS.

Figure 15:
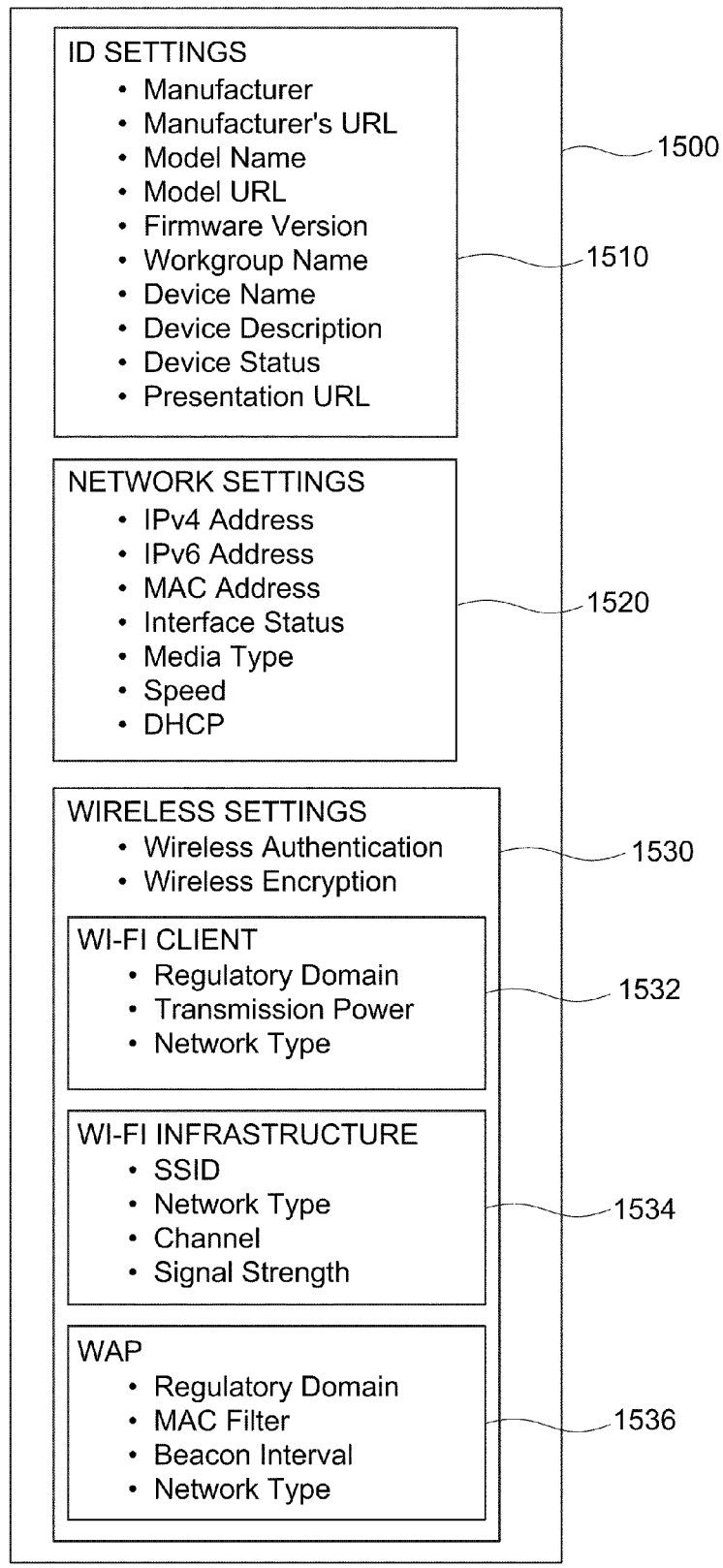
FIG. 15 is a data structure diagram representing device configuration settings in accordance with an embodiment.

FIG. 15 illustrates a conceptualization of the device settings configuration file 1500. File 1500 includes identification (ID) settings 1510, network settings 1520, and wireless settings 1530 for a device. ID settings 1510 relate to information regarding the manufacturer of the device, the manufacturer's web site, the model name of the device, the web site for the device model, the firmware version of the firmware in the device, the device's name, a description of the device, the status of the device, a workgroup name for the device, and a presentation URL. Network settings 1520 relate to information regarding the IPv4, IPv6, and MAC addresses of the device, the status of the network interface (e.g. active, no signal, authenticating, disabled), the type of media (e.g. 802.3, 1394, 802.11, USB, Bluetooth), the speed of the connection, and whether DHCP is enabled.

Wireless settings 1530 relate to information regarding the wireless authentication protocols (e.g. open, shared, WPA-NONE, WPA, WPAPSK, WPA2, WPA2PSK) and the wireless encryption protocols (e.g. WEP, TKIP, AES) used by the device. Wireless settings 1530 further includes wireless settings profiles specific to the function of the device. If the device is a wireless client, wireless settings 1530 includes wi-fi client settings 1532. These settings relate to information regarding the regulatory domain of the device, the transmission power of the device, and the network type (e.g. 802.11a/b/g). If the device is a wireless infrastructure device, wireless settings 1530 includes wi-fi infrastructure settings 1534. These settings relate to information regarding the SSID, network type, channel, and signal strength of the wireless infrastructure. If the device is a WAP, wireless settings 1530 includes WAP settings 1536. These settings relate to information regarding the regulatory domain, MAC filter, beacon interval, and network type of the WAP.

It will be appreciated that a system and method for network device configuration have been disclosed herein. In view of the many possible embodiments to which the principles of the described devices and techniques may be applied, it should be recognized that the embodiments described herein with respect to the drawing figures are meant to be illustrative only and should not be taken as limiting the scope of the claimed subject matter. For example, those of skill in the art will recognize that the illustrated embodiments can be modified in arrangement and detail without departing from the spirit of described techniques. Although the techniques for configuring network devices with a portable media device are described in terms of software modules or components, those skilled in the art will recognize that such may be equivalently replaced by hardware components. Therefore, the specific features, techniques, and acts described above are disclosed as example forms of implementing the claimed subject matter.

What is claimed is:

1. A method implemented by a computing device comprising:
    establishing a connection to a portable electronic device having computer-readable storage;
    storing network configuration settings and executable code in the computer-readable storage of the portable electronic device to enable configuration of one or more configurable devices to join a network, the network configuration settings and executable code including at least:
        one or more configuration files having the network configuration settings for transfer to the one or more configurable devices; and
        a network set up application configured to execute when the portable electronic device is connected to the one or more configurable devices to upload the network configuration settings to the one or more configurable devices thereby configuring the one or more configurable devices to operate in the network upon successful configuration and with the portable electronic device removed.

2. The method of claim 1, wherein the storing comprises communicating the network configuration settings and executable code wirelessly to the portable electronic device over a wireless connection.

3. The method of claim 1, wherein the network configuration settings include at least wireless network settings for the network.

4. The method of claim 1, wherein the portable electronic device comprises a wireless communication device.

5. The method of claim 1, further comprising:
    obtaining the network configuration settings through an application programming interface of the computing device; and
    generating the one or more configuration files based on the network configuration settings that are obtained.

6. The method of claim 1, further comprising prompting for removal of the portable electronic device and connection of the portable electronic device to each of the one or more configurable devices to configure the one or more configurable devices for the network.

7. The method of claim 6, further comprising upon reconnection of the portable electronic device to the computing device, displaying results of configuration of the one or more configurable devices performed using the portable electronic device.

8. The method of claim 1, wherein the storing network configuration settings and executable code in the computer-readable storage of the portable electronic device includes storing an auto-run file to cause automatic execution of the network set up application when the portable electronic device is connected to the one or more configurable devices.

9. The method of claim 1, wherein the storing network configuration settings and executable code in the computer-readable storage of the portable electronic device includes storing a name of the network and a network encryption key.

10. The method of claim 1, wherein the one or more configuration files are configured as extensible markup language (XML) files.

11. A portable electronic device comprising:
an interface operable to connect the portable electronic device to a computing device to obtain network configuration settings for a network and connect the portable electronic device to one or more configurable devices to transfer the configuration settings to the one or more configurable devices; and
computer-readable storage having stored thereon:
one or more configuration files having the network configuration settings for transfer to the one or more configurable devices; and
a network set up application configured to execute when the portable electronic device is connected to the one or more configurable devices to upload the network configuration settings to the one or more configurable devices thereby configuring the one or more configurable devices to operate in the network upon successful configuration and without the portable electronic device.

12. The portable electronic device of claim 11, wherein the one or more configuration files comprises separate XML files corresponding to each of a local area network, a wide area network, a wireless network and a broadband modem.

13. The portable electronic device of claim 11, wherein the one or more configuration files comprises at least a name of the network and a network encryption key.

14. The portable electronic device of claim 11, further comprising a device configuration file describing an applied configuration of at least one of the one or more configurable devices performed via the portable electronic device.

15. The portable electronic device of claim 11, wherein the interface is configured to enable the portable electronic device to connect wirelessly to obtain and transfer the network configuration settings.

16. The portable electronic device of claim 11, wherein the portable electronic device comprises a portable communication device.

17. One or more computer-readable storage media storing instructions that, when executed by a computing device, implement a network configuration wizard to facilitate configuration of a network, the network configuration wizard configured to:
present a user interface to prompt a user to input a name and generate a network encryption key for the network;
obtain network configuration settings for the network from an operating system of the computing device;
prompt the user via the user interface to establish a connection to a portable electronic device;
transfer the network configuration settings and executable code to the portable electronic device to enable configuration of one or more configurable devices to join the network, the network configuration settings and executable code including at least:
the network name and the network encryption key;
one or more configuration files having the network configuration settings for transfer to the one or more configurable devices; and
a network set up application configured to execute when the portable electronic device is connected to the one or more configurable devices to transfer the network configuration settings to the one or more configurable devices thereby enabling the one or more configurable devices to join the network; and
prompt the user via the user interface to disconnect the portable electronic device and connect the portable electronic device to each of the one or more configurable devices to configure the one or more configurable devices for the network.

18. One or more computer-readable storage media of claim 17, wherein the network set up application is configured to execute automatically upon connection to the one or more configurable devices.

19. One or more computer-readable storage media of claim 17, wherein the network configuration wizard is further configured to transfer the network configuration settings and executable code wirelessly to the portable electronic device via a wireless connection.

20. One or more computer-readable storage media of claim 17, wherein the network configuration wizard is further configured to:
prompt the user via the user interface to reconnect the portable electronic device to the computing device when configuration of the one or more configurable devices using the portable electronic device is complete; and
upon reconnection of the portable electronic device to the computing device, display via the user interface results of the configuration of the one or more configurable devices.

* * * * *